United States Patent [19]
Morita

[11] Patent Number: 5,073,870
[45] Date of Patent: Dec. 17, 1991

[54] MODULAR MULTIPLICATION METHOD AND THE SYSTEM FOR PROCESSING DATA

[75] Inventor: Hikaru Morita, Hichiohji, Japan

[73] Assignee: Nippon Telegraph and Telephone Corporation, Japan

[21] Appl. No.: 471,787

[22] Filed: Jan. 29, 1990

[30] Foreign Application Priority Data

Jan. 30, 1989 [JP] Japan ............................. 1-17700
Jun. 9, 1989 [JP] Japan ............................. 1-147795
Aug. 11, 1989 [JP] Japan ............................. 1-206973

[51] Int. Cl.$^5$ ............................................. B06F 7/38
[52] U.S. Cl. ............................. 364/746; 364/754
[58] Field of Search ......... 364/746, 754, 757, 579–760

[56] References Cited

U.S. PATENT DOCUMENTS

4,346,451 8/1982 Katayama ..................... 364/746
4,366,549 12/1982 Katayama ..................... 364/746

OTHER PUBLICATIONS

Kai Hwang, "Computer Arithmetic Principles, Architecture, and Design", Chapter 7, 1979.
Baker, "Fast Computation of A * B Modulo N", Electron Letter, vol. 23, No. 15, pp. 794–795 (1987).
"On a Fast Iterative Multiplication Method by Recoding Intermediate Products", by Naofumi Takagi and Shuzo Yajima, Kyoto University (no publication date).

*Primary Examiner*—Tan V. Mai
*Attorney, Agent, or Firm*—Wigman & Cohen

[57] ABSTRACT

To markedly improve the computational speed of $A \times B$ modulo N computation as compared with the prior-art Baker's method where A denotes a multiplicand: B denotes a multiplier; and N denotes a modulus, the number of multiply-addition and division (modular) substractions is reduced on the basis of any given same higher radix number r. In practice, the modular subtractors $c(k)N$ are previously determined on the basis of the partial products $b(k-1)A$ at the succeeding processing stage $(k-1)$ to reduce the absolute value of the partial remainder $R(k)$ down on a value less than a modulus N, so that bit overflow from a predetermined computational range can be prevented. For instance, when the partial product $b(k)A$ at the succeeding processing stage $(k-1)$ is large, the modular subtracter $c(k)N$ at the current stage $(k)$ is also determined large. Further, the most significant bit of the multiplicand A is eliminated by transforming the multiplicand A from a range within $[0, N-1]$ to a range $[-N/2, N/2]$ to reduce the absolute value of the partial product. This is necessary to apply the same radix number r to both the partial products and the modular subtracters.

7 Claims, 33 Drawing Sheets

FIG.1 (A)
PRIOR ART

CONVENTIONAL METHOD
(7-bit binary numbers)

A : (39) · · 0100111
B : (93) · · 1011101
N : (121) · · 1111001

```
             0 1 0 0 1 1 1   (39) · · A
          X) 1 0 1 1 1 0 1   (93) · · B
         ─────────────────
        + 0 1 0 0 1 1 1      · · A/0
      + 0 0 0 0 0 0 0 0      · · A/0
    + 0 1 0 0 1 1 1          · · A/0
  + 0 1 0 0 1 1 1            · · A/0
+ 0 1 0 0 1 1 1              · · A/0
+ 0 0 0 0 0 0 0              · · A/0
+ 0 1 0 0 1 1 1              · · A/0
─────────────────────────────
0 0 1 1 1 0 0 0 1 0 1 0 1 1  (3627) · · A×B
  - 1 1 1 1 0 0 1            · · -N/0
    - 1 1 1 1 0 0 1          · · -N/0
      - 1 1 1 1 0 0 1        · · -N/0
        - 1 1 1 1 0 0 1      · · -N/0
          - 0 0 0 0 0 0 0    · · -N/0
            - 0 0 0 0 0 0 0  · · -N/0
              - 1 1 1 1 0 0 1 · · -N/0
─────────────────────────────
REMAINDER ──▶ 1 1 1 0 1 1 0  (118)
              7 ········ 2 1    · · A×B mod N
```

(6 PARTIAL PRODUCTS ON RADIX 2, 7 ADDITIONS)
(7 MODULAR SUBTRACTERS ON RADIX 2, 7 SUBTRACTIONS)

$$A \times B \bmod N = R \text{ of } \frac{A \times B}{N} = \frac{(39) \times (93)}{(121)} = \frac{(3627)}{(121)} = (29), R = (118)$$

NOTE: ( ) DENOTES DECIMAL NUMBERS

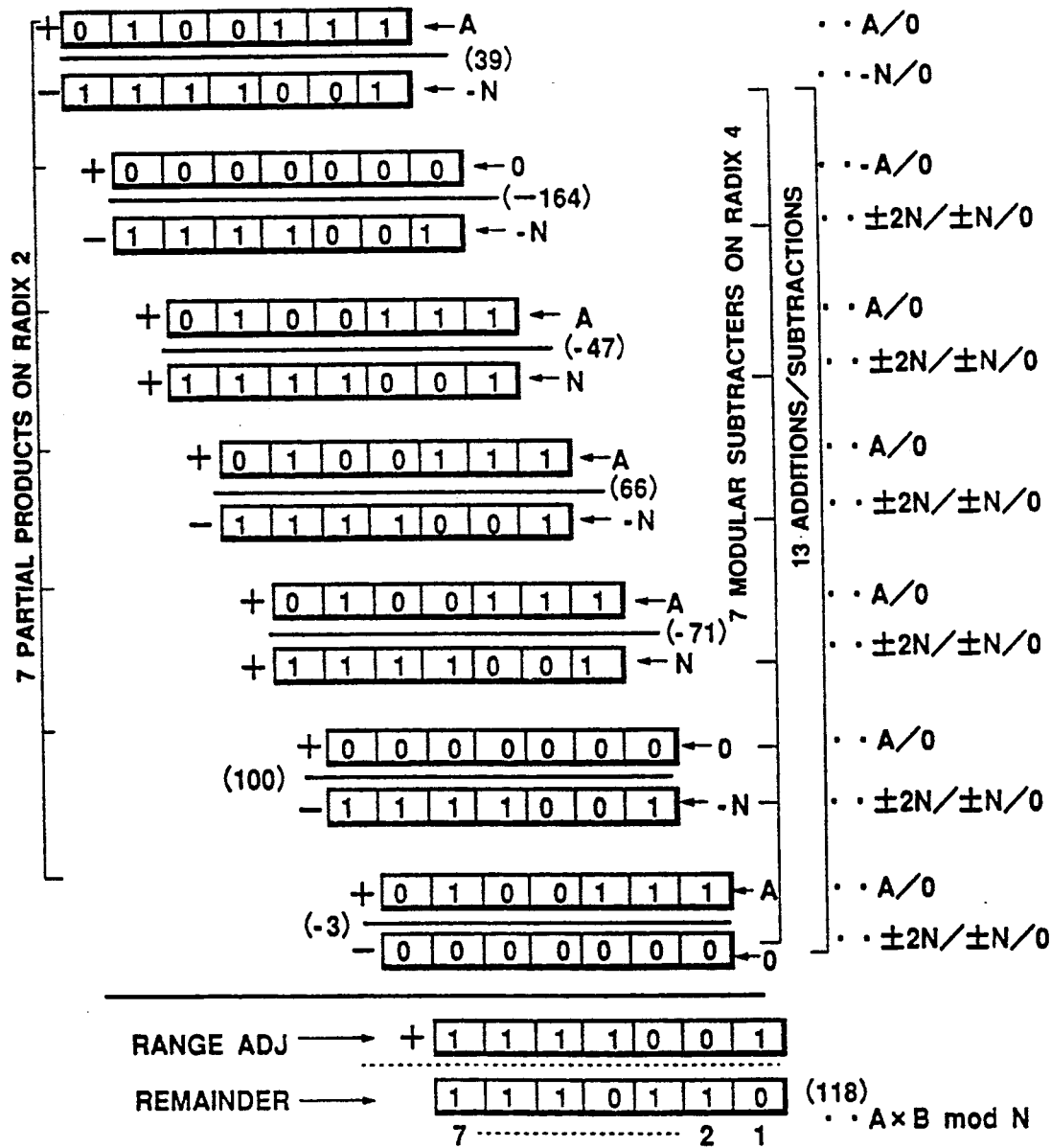

INVENTION METHOD
(7-bit binary numbers)
(1 2 -1 1) (REDUNDANT REPRE'TION ON RADIX 4)

A : (39) · · · 0100111
B : (93) · · · 1011101
N : (121) · · · 1111001

NOTE : ( ) DENOTES DECIMAL NUMBERS

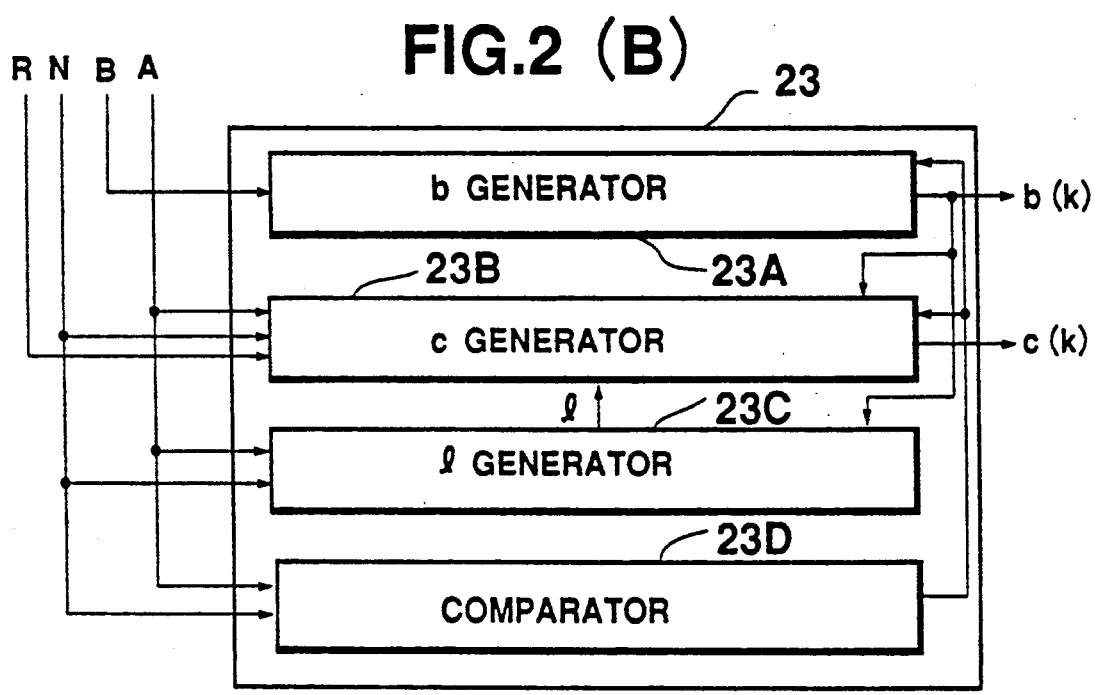

$R = 4R + b(k)A - cN$

FIG.4 (B)i
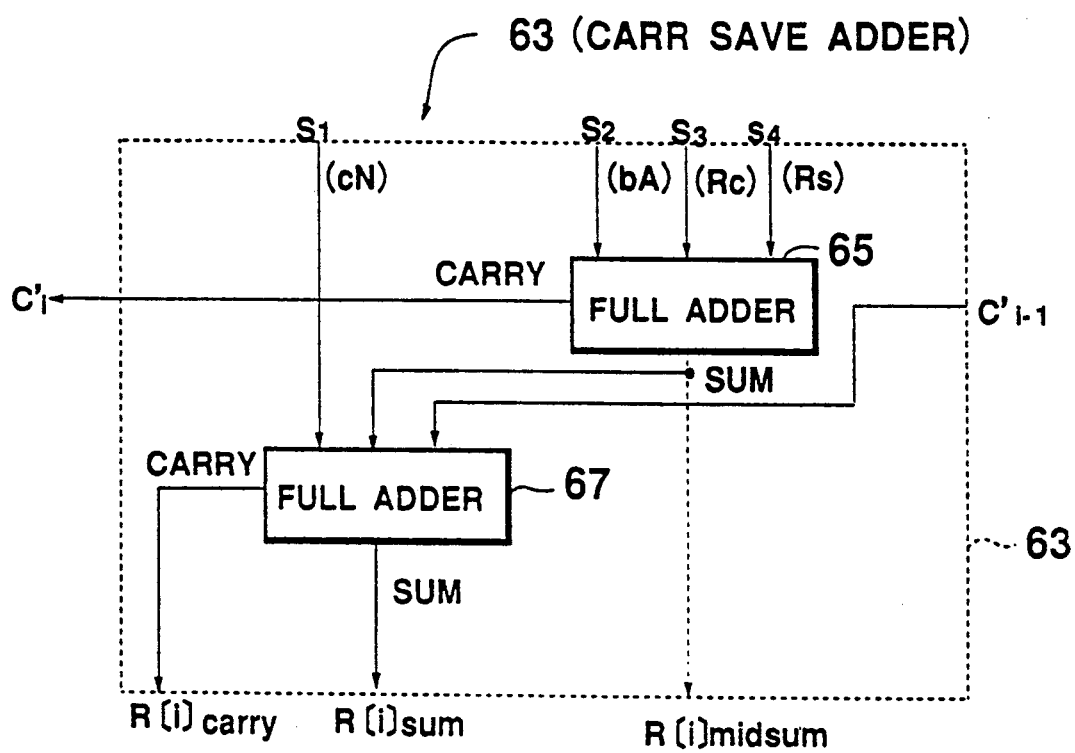
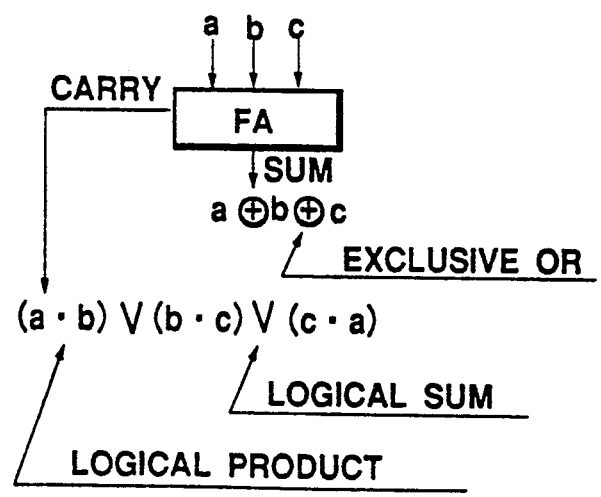
FIG. 4 (B)ii $R = 4(R-cN) + b(k)A$

FIG.5 (B)i
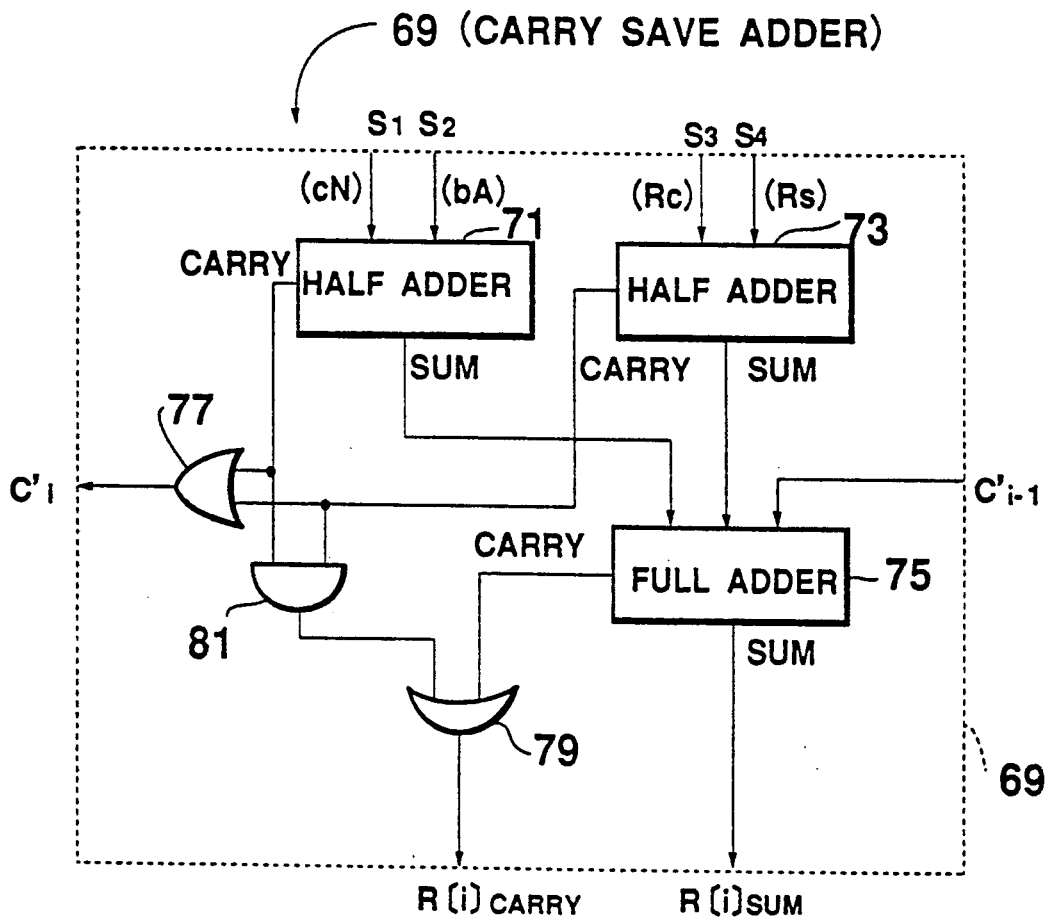
FIG.5 (B)ii
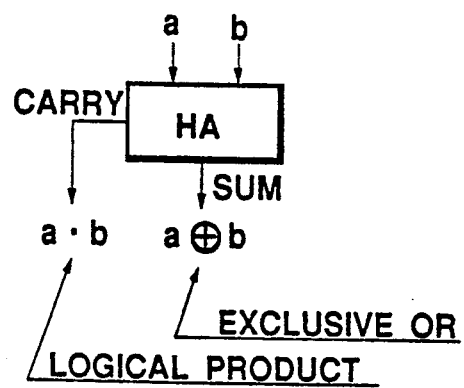

$\left|\dfrac{R(k-1)}{N}\right| < d$    $\left|\dfrac{2R(k)}{N}\right| < rd$ $R(k-1) = \underline{2R(k)} - cN$
          ↳ Binary notation

FIG.6 (B)

$$
\begin{array}{r}
\phantom{11\overline{)}}0\ 0\ 1\ 1\ 1\ 1 \cdots (15) \\
11 \cdots (3)\overline{)1\ 0\ 1\ 1\ 0\ 1 \cdots (45)}
\end{array}
$$

```
         0  0
         ─────
         1  0  ············  (2)  → R(5)
            0  0
            ─────
            1  0  1  ·······  (5)  → R(4)
               1  1  ········ (3)
               ─────
               1  0  1  ····· (5)  → R(3)
                  1  1  ····· (3)
                  ─────
                  1  0  0  ·· (4)  → R(2)
                     1  1  ·· (3)
                     ─────
                     1  1  ·· (3)  → R(1)
                        1  1 ·(3)
                        ─────
                              0 ·(0) → R(0)
```

⇩

TO determine c in R(3)=2R(4) -cN, since 2R(4)=(5) , c=2R(4)／N=(5)／(3)=<u>1.6</u> :

C=1 is obtained , so that

R(3)=(5)-1×(3)=(2)=(10)$_2$ ( )$_2$ denotes binary numbers

EXAMPLE OF ROBERTSON DIAGRAM IN COMPUTATION

| | STAGE NUMBERS OF ADDITIONS/SUBTRACTIONS | | SPEED RATIO |
|---|---|---|---|
| | INVENTION (r=4) | BAKER | |
| | $\frac{3}{4}n$ (MULTIPLY: $3n/8$, DIVISION: $3n/8$) | $\frac{5}{4}n$ (MULTIPLY: $n/2$, DIVISION: $3n/4$) | 1.7 |
| | $n$ (MULTIPLY: $n/2$, DIVISION: $n/2$) | $2n$ (MULTIPLY: $n$, DIVISION: $n$) | 2 |

DEFINITION OF ($f_c$, $f_s$)

| $B_s[2K] B_c[2K-1]$ | $B_s[2K-1] B_c[2K-2]$ | | | |
|---|---|---|---|---|
| | 00 | 01* | 11 | 10* |
| 00 | 0,0 | (0,1)/(1,-3) | 1,-2 | (0,1)/(1,-3) |
| 01 | 1,-2 | 1,-1 | 1,0 | 1,-1 |
| 11 | 1,0 | (1,1)/(2,-3) | 2,-2 | (1,1)/(2,-3) |
| 10 | 1,-2 | 1,-1 | 1,0 | 1,-1 |

NOTE*: IF $B_s[2K-2]=0$, LEFT SIDE FUNCTIONS ($f_c$, $f_s$) ARE SELECTED; OTHERWISE, RIGHT SIDE FUNCTIONS ARE SELECTED

FIG.13

|  | HIGHER SIGN BIT RANGE "k" | | LOWER SIGN BIT RANGE "k-1" | | |
|---|---|---|---|---|---|
| Bs : ....... | Bs [2k] | Bs [2k-1] | Bs [2k-2] | Bs [2k-3] | ....... |
| Bc : ....... | Bc [2k-1] | Bc [2k-2] | Bc [2k-3] | Bc [2k-4] | ....... |

[ ] DENOTES VECTORS HAVING SIGNS

FIG.14

DEFINITION OF $(f_c, f_s)$

| Bs [2k] Bc [2k-1] | Bs [2k-1] Bc [2k-2] | | | |
|---|---|---|---|---|
| | 00 | 01 | 11 | 10 |
| 00 | 0,0 | 0,1 | 1,-2 | 0,1 |
| 01 | 1,-2 | 1,-1 | X | X |
| 11 | 1,0 | 1,1 | X | X |
| 10 | 1,-2 | 1,-1 | 1,0 | 1,-1 |

X INDICATES THAT FUNCTIONS $(f_c, f_s)$ HAVE NOT ANY VALUES

FIG.15 (A)i
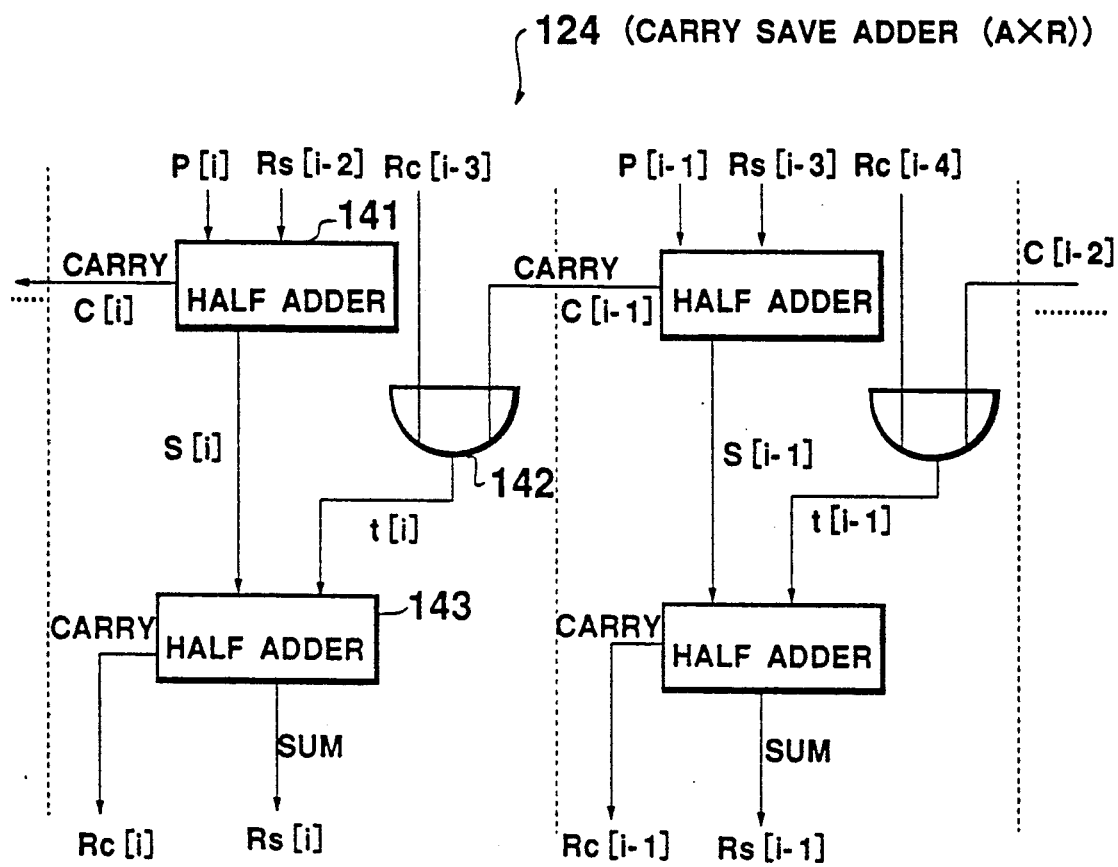
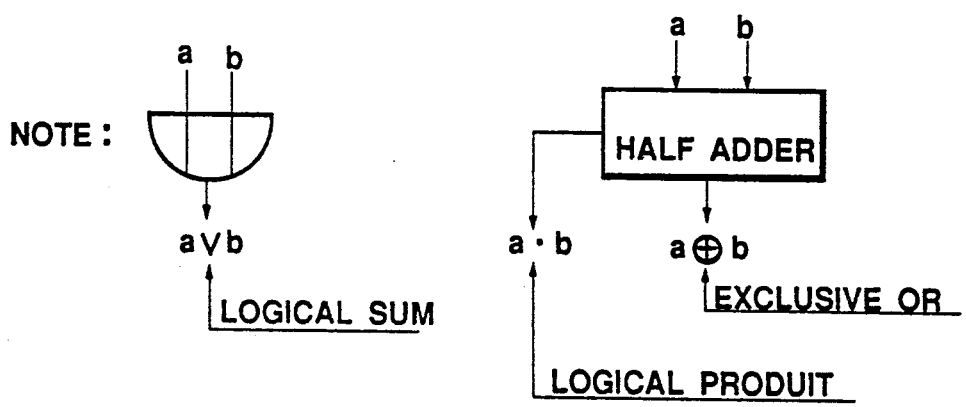
FIG.15 (A)ii

FIG.16(A)
PRIOR ART
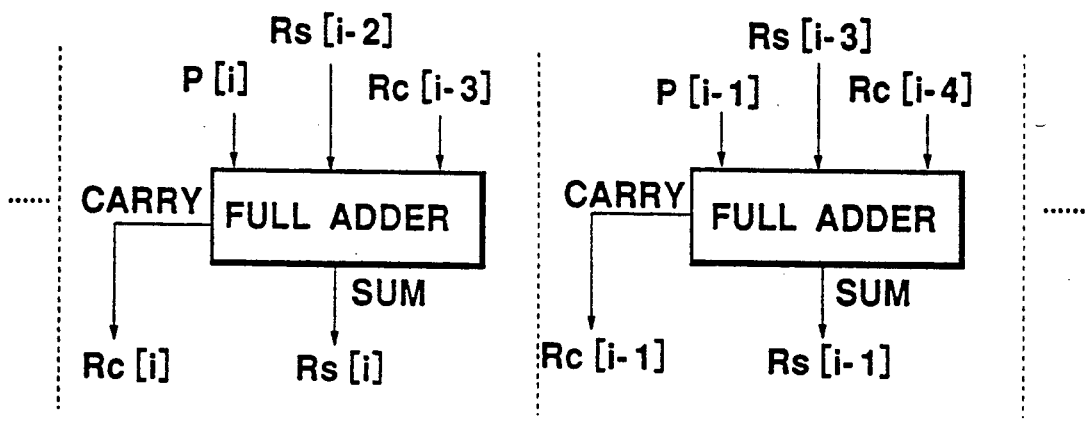
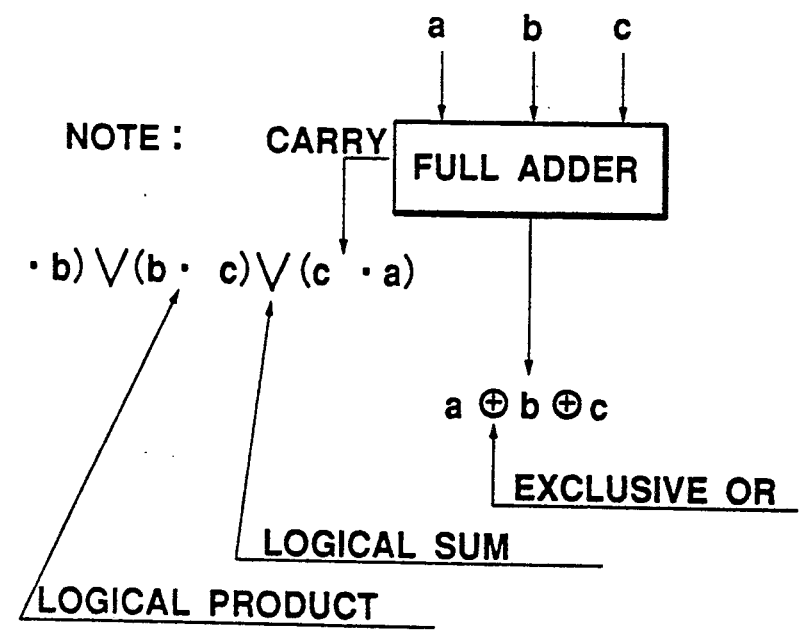
FIG.16(B)
PRIOR ART

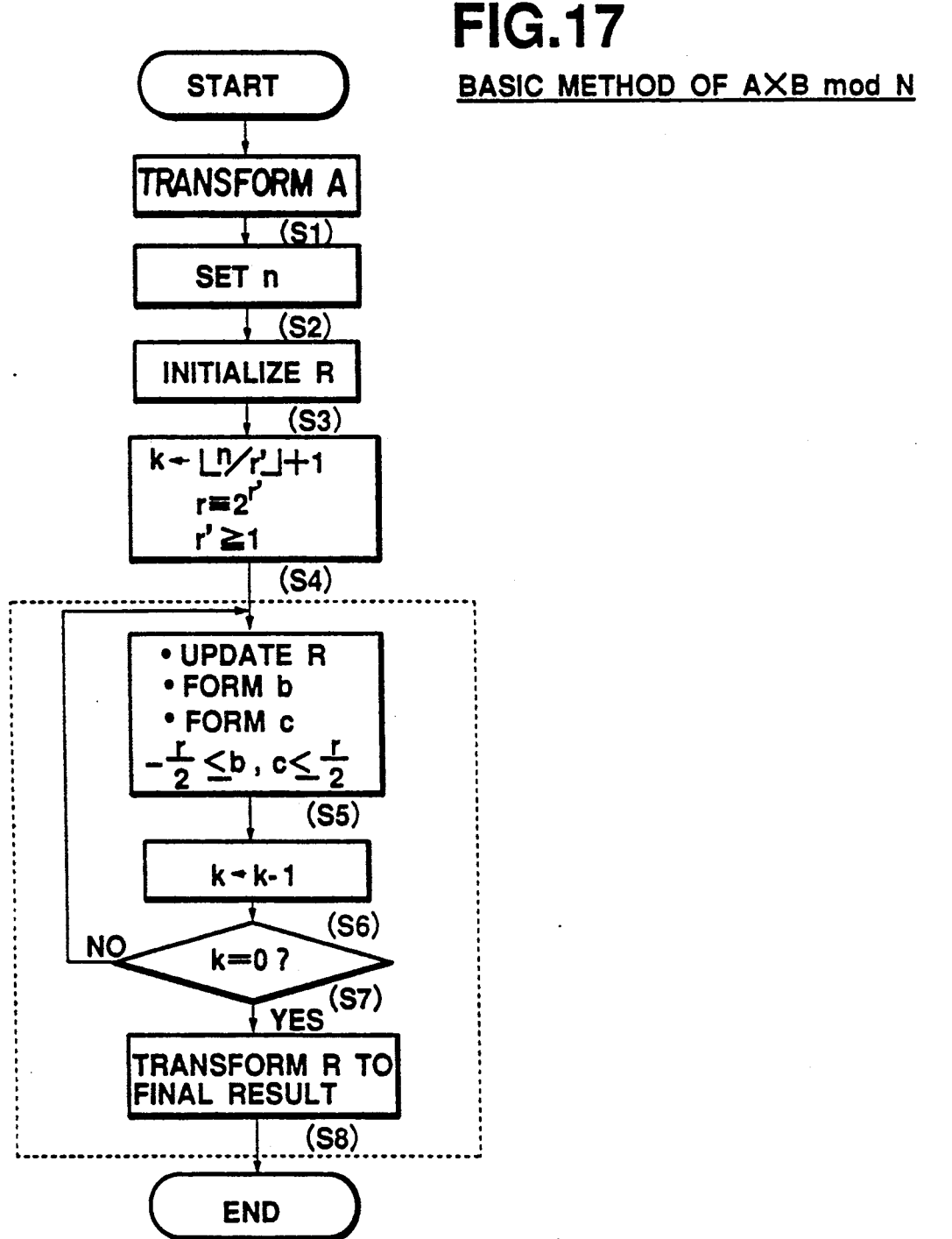

FIG.18 (A)
A TRANSFORMATION (1st mod)
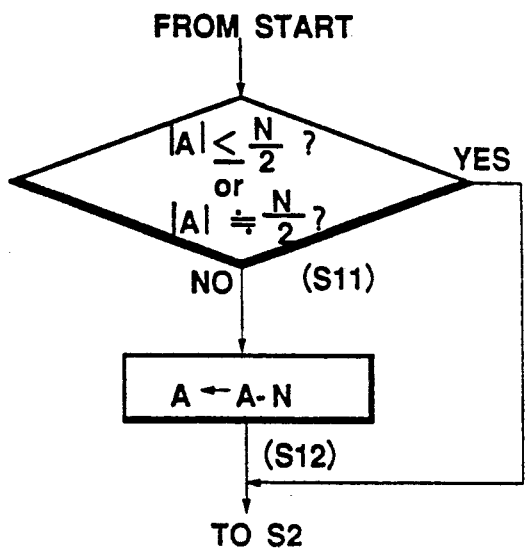
FIG.18 (B)
A TRANSFORMATION (2nd mod)
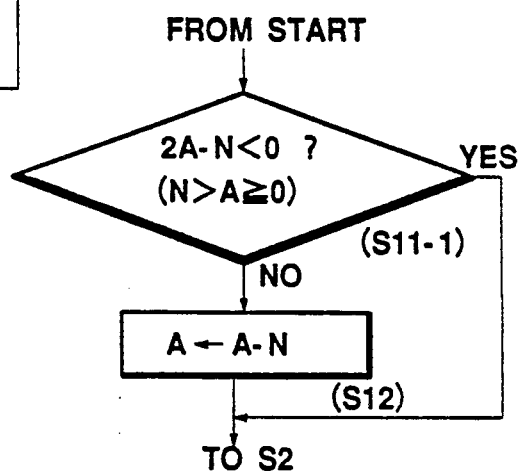
FIG.18 (C)i
A TRANSFORMATION (3nd mod)
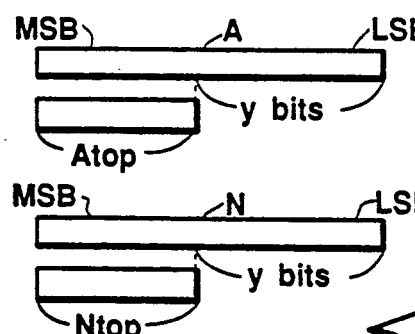
Atop : HIGHER SIGN BITS OF A
Ntop : HIGHER SIGN BITS OF N
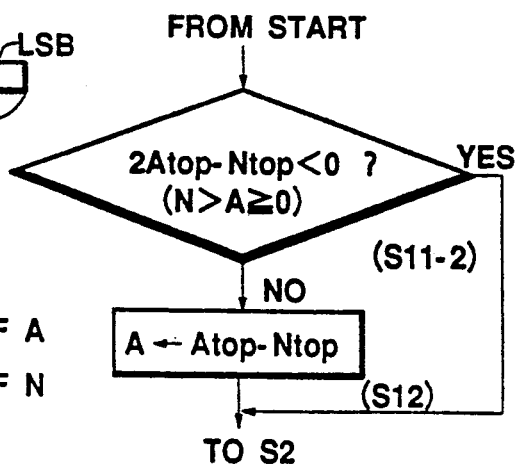
FIG.18 (C)ii N SETTING (1st mod)

N SETTING (2nd mod)

m : INTEGER

R INTIALIZATION (1st mod)

R INTIALIZATION (2nd mod)

REDUNDANT REPRESENTATION :
$R = R_s + 2R_c$
$R_s$ = SUM OF R
$R_c$ = CARRY OF R

R UPPATE AND b,c FORMATION
(1st mod)

b(k) A : PARTIAL PRODUCT
c(k) N : MODULAR SUBTRACTER

R UPPATE AND b,c FORMATION
(2nd mod)

R TRANSFORMATION (1st mod)

R TRANSFORMATION (2nd mod)

b(k) FORMATION (1st mod)

FROM S4

(S51-1)

TO S52 b(k) FORMATION (2nd mod)

FROM S4

(S51-2)

TO S52 b(k) FORMATION (3rd mod)

FROM S4

(S51-3)

TO S52 fs, fc: FUNCTIONS

FIG.23 (D)

b(k) FORMATION (4th mod)

FROM S4

SELECT (fc (Bs [2k] Bc [2k-1], Bs [2k-1] Bc [2k-2]),
        fs (Bs [2k] Bc [2k-1], Bs [2k-1] Bc [2k-2]))

FROM TABLE BLOW BY COMBINATION :

(fc , fs)

| Bs [2k] Bc [2k-1] | Bs [2k-1] Bc [2k-2] | | | |
|---|---|---|---|---|
| | 0 0 | 0 1 | 1 1 | 1 0 |
| 0 0 | 0 , 0 | 0 , 0 | 1 , -2 | 0 , 1 |
| 0 1 | 1 , -2 | 1 , -1 | × | × |
| 1 1 | 1 , 0 | 1 , 1 | × | × |
| 1 0 | 1 , -2 | 1 , -1 | 1 , 0 | 1 , -1 |

× INDICATES THAT (fc , fs) HAVE NOT ANY VALUES (S51-4)

b(k) FORMATION (5n·mod)

FROM S4

FORM fs AND fc BY COMPUTATION AS FOLLOWS:

$fs(Bs[2k]\ Bc[2k-1],\ Bs[2k-1]\ Bc[2k-2])$ $\leftarrow -2 \times (Bs[2k] \oplus Bc[2k-1])$
$+ Bs[2k-1] + Bc[2k-2]$
$- 4 \times \overline{(Bs[2k] \oplus Bc[2k-1])} \cdot Bs[2k-1] \cdot Bc[2k-2]$ $fs(Bs[2k]\ Bc[2k-1],\ Bs[2k-1]\ Bc[2k-2])$ $\leftarrow Bs[2k] \vee Bc[2k-1] \vee (Bs[2k-1] \cdot Bc[2k-2])$ (S51-5)

TO S52

$\oplus$ : EXCLUSIVE OR
$\cdot$ : LOGICAL PRODUCT
$\vee$ : LOGICAL SUM
$\overline{\phantom{-}}$ : NEGATION
[ ] : BIT LEVEL VECTORS WITH SIGN BITS c(k) FORMATION (1st mod)

FROM S52

DETERMINE $\ell_i \, b(k-1)$, $\ell_{-i} \, b(k-1)$ AFTER A TRANSFORMATION $$\ell_i(b(k-1)) \equiv i - \frac{1}{2} \cdot \frac{b(k-1) A}{rN}$$

$$\ell_{-i}(b(k-1)) \equiv -i + \frac{1}{2} \cdot \frac{b(k-1) A}{rN}$$

$$b(k-1) \in \{-\frac{r}{2}, -\frac{r}{2}+1, \ldots, -1, 0, 1, \ldots, \frac{r}{2}-1, \frac{r}{2}\}$$

(S53-1)

(S53-2)

TO S54

$\equiv$ = DEFINITION
$\ell$: BOUNDARY INDICES
$\in$: SET c(k) FORMATION (2nd mod)

FROM S52

(S53-3)

TO S54 c(k) FORMATION (3nd mod)

MODULAR MULTIPLICATION METHOD AND THE SYSTEM FOR PROCESSING DATA

BACKGROUND OF THE INVENTION

1. Field of the Invention

The present invention relates to a modular multiplication method and the system for executing modular multiplication such as A×B modulo (referred to as mod, hereinafter) N at high speed, where A denotes a multiplicand; B denotes a multiplier and N denotes a modulus. The present invention is effectively available for cryptographic and authentic systems or technique, because modular exponentiation (power multiplication) such as $M^e$ mod N (where e denotes the exponent) can be executed in the same way as A×B mod N.

2. Description of the Prior Art

In the conventional method of modular multiplication A×B mod N, in general as shown in FIG. 1(A), after A×B has been calculated, the calculated A×B is divided by N to obtain a remainder as its calculation result. In this drawing, the multiplication is executed by shifting the multiplicand A bit by bit toward the most significant bit direction for multiply addition on the basis of a radix 2, and the division is executed in the same way by shifting the modulus N in the opposite direction for division subtraction. Therefore, when the number n of bits is determined in binary notation of A, B and N, n-time multiply additions of partial products (A or O) are required for the multiplication at its maximum and further n-time division subtractions of modular subtracters (N or O) are required for the division at its maximum. Further, FIG. 1(A) shows an example of 7-bit binary numbers, in which A/O represents A or O.

In this conventional method, although subtractions are repeated for division, since the modular subtracters are not previously determined, it has been necessary to compare each partial remainder with the modulus N for each partial subtraction operation, so that the divisional operation is not effective and therefore the computational speed is low.

Further, when the conventional method is executed by a general purpose computer, since each number A, B or N is divided into the unit number of bits (digits) (e.g. 32 bits) before repeating the additions and subtractions, the number of the additions and subtractions further increases. As a result, when the number of bits (digits) n increases, there exists a problem in that the divided intermediate results must be stored in a great number of registers, so that it has been difficult to execute the computation (calculation) at high speed. In this connection, although it is possible to improve the computational speed by executing a multiplication after the bits have been divided into the number of a processing unit of the multipliers incorporated in the general purpose computer, there still exists a problem in that the number of access to memory increases and therefore the computational speed is still low.

Further, where specialized circuits which can simultaneously process many bits are incorporated, although the computational speed can be improved, there arises another problem in that hardware of 2n-bit length is required and therefore the hardware efficiency is not high.

To improve the low hardware efficiency of the conventional divisional operation, a method of decreasing the number of additions and subtractions related to divisional operations with reference to a remainder reference table has been proposed. The above-mentioned method of using a remainder reference table is to transform a multiplication result represented by several higher significant bits into a remainder represented by lower significant bits after a 2n-bit multiplication result has been obtained. For instance, in the case of 4-bit unit, remainders by divisors or moduli N of $0001 \times 2^n$, $0010 \times 2^n, \ldots 1111 \times 2^n$ are previously listed in a remainder reference table, and the multiplication result can be obtained by adding a value obtained by removing 4 higher significant bits to the remainder represented by the 4 higher significant bits, in order to reduce the number of bits one by one, and the computational processing is completed when the n-bit multiplication result has been obtained.

In this method, however, the speed of the multiplication operation is not improved. Further the remainder reference table inevitably increases the memory capacity to store the table. Additionally, since n-bit remainder table data are transferred to or from calculators; the calculating speed is not high and the circuit volume is large; and further the control is rather complicated. In other words, there exist serious problems with the computational speed, hardware volume, and circuit design complication.

To overcome the problems involved when multibit specialized circuits are incorporated in the conventional method, Baker has proposed a method of using specialized circuits by interposing modular subtracters between two multiply additions, so that the operation can be executed by only n-bit length specialized circuits, as disclosed by "Fast Computation of A*B Modulo N", by P. W. Baker, Electron Letter, Vol. 23, No. 15, pp 794-795 (1987).

In this Baker method, as shown in FIG. 1(B), n-bit partial products and n-bit partial modular subtracters are added or subtracted in sequence beginning from the most significant bits. The partial products are determined by taking bit by bit the multiplier B from the most significant bit and by adding A or O to the partial remainder. On the other hand, $-2N, -N, O, N$, or $2N$ modular subtracters are determined according to the value of the partial remainder and then added to the partial remainder. The partial remainder is shifted one bit toward the most significant bit side, and the above operations are repeated. In this Baker method, although the multiplication is executed on the basis of a radix number 2 bit by bit, the division is executed on the basis of a radix number 4 with a range from $-2N$ to $2N$ in order to prevent the partial remainders from overflowing from the n-bits length computational range.

This Baker method can solve the problem involved in the specialized circuits; however, the computational speed is not improved because the number of additions and subtractions cannot be reduced markedly in comparison with the conventional method.

As described above in the prior-art methods, there exist various problems with respect to the computational speed, hardware volume, circuit design complication, etc.

SUMMARY OF THE INVENTION

With these problems in mind, therefore, it is the primary object of the present invention to provide a modular multiplication method and the system high in computational speed, small in circuit scale, simple in circuit configuration, and easy in circuit design procedure.

To achieve the above-mentioned object, the modular multiplication method, according to the present invention, of A×B modulo N where A denotes a multiplicand, B denotes a multiplier, N denotes a modulus, which comprises the steps of: (a) transforming A from A∈[0, N] to A∈[−N/2, N/2], where ∈ denotes a set of integers; (b) setting the number of bits n of each variable of A, B or N; (c) initializing a remainder R; (d) determining the number of repeated processing stages k as k←⌊n/r⌋+1 where r denotes a radix number r≡2$^r$ (r'≧1); ⌊n/r⌋ denotes a maximum integer less than n/r'; and ← denotes a substitution; (e) updating a partial remainder R and forming a partial multiplier b and a partial quotient c both within a range of −r/2≦b, c≦r/2; (f) processing a present stage (k) as k←k−1; (g) checking whether the present stage (k) is zero; (h) if the stage (k) is not zero, returning to the above step (e); and (i) if the stage (k) is zero, transforming a final partial remainder R into a solution of A×B modulo N. The step of transforming A comprises the steps of: (a) comparing an absolute multiplicand |A| with a half divisor N/2 as |A|≦N/2 or |A|≃N/2; (b) if |A|≦N/2 or |A|≦N/2, proceeding to the step (b) in claim 1; and (c) if |A|>N/2, substituting A−N for A as A←A−N, and proceeding to the step (b) in claim 1. The step of setting the number of bits n of each variable of A, B, or N comprises the step of setting n as n←⌊log$_2$ N⌋+1, where ⌊log$_2$ N⌋ denotes a maximum integer less than log$_2$ N.

Further, the partial multiplier b(k) can be formed on the basis of the multiplier B in accordance with the following expression as $$B = \sum_{k=1}^{\lfloor n/r \rfloor +1} b(k) \cdot r^{k-1}$$

where b(k) lies within a range of −r/2≦b(k)≦r/2, and r denotes a radix number, and ⌊x⌋ denotes a maximum integer less than x. The partial quotient c(k) is formed by defining following comparative indices l$_i$ (b(k−1)), l$_{-i}$ (b(k−1)) immediately after the multiplicand A has been transformed, as follows:

$$l_i(b(k-1)) = i - \frac{1}{2} - \frac{b(k-1)A}{rN}$$

$$l_{-i}(b(k-1)) = i + \frac{1}{2} - \frac{b(k-1)A}{rN}$$

where b(k−1)∈{−r/2, −r/2+1, ..., −1, 0, 1, ... r/2−1, r/2}
where ∈ denotes the set of integers and i denotes an i-th bit from the least significant bit, and determining the present stage partial quotient c(k) as follows:

c(k)=i, if l$_i$N<R(k−1)≦l$_{i+1}$N c(k)=o, if l$_{-1}$N≦R(k−1)≦l$_1$N c(k)=−i, if l$_{-i-1}$N≦R(k−1)<l$_{-i}$N.

Further, a first modification of the step of updating the partial remainder R and forming the partial multiplier b and partial quotient c comprises the steps of: (a) forming a present stage partial multiplier b(k); (b) updating a succeeding stage partial remainder R(k−1) by the present stage partial remainder R(k) and the present stage partial multiplier b(k) as R(k−1)←rR(k)+b(k)A; (c) forming a succeeding stage partial multiplier b(k−1); (d) forming the present stage partial quotient c(k); (e) further updating the succeeding stage partial remainder R(k−1) by the succeeding stage remainder R(k−1) and the present stage partial modular subtracter c(k)N as R(k−1)←R(k−1)−c(k)N; and (f) progressing the present stage (k) as k←k−1; (g) checking whether the present stage (k) is zero; (h) if the present stage (k) is not zero, returning the above step (b); and (i) if the present stage (k) is zero, returning to the step (i) in claim 1. A second modification of the step of updating the partial remainder R and forming the partial multiplier b and partial quotient c comprises the steps of: (a) initializing a preceding stage partial quotient c(k+1) to zero as c(k+1)←0; (b) forming a present stage partial multiplier b(k); (c) updating a succeeding stage partial remainder R(k−1) by a present stage partial remainder R(k), a preceding stage partial quotient c(k+1) and a present stage partial multiplier b(k) as R(k−1)←r{R(k)−c(k+1)N}+k(k)A; (d) forming a succeeding stage partial multiplier b(k−1); (e) forming a present stage partial quotient c(k); (f) progressing the present stage (k) as k←k−1; (g) checking whether the present stage (k) is zero; (h) if the present stage (k) is not zero, returning to the above step (c); and (i) if the present stage (k) is zero, returning to the step (i) of claim 1; and wherein in step (i) of claim 1 the final partial remainder R is updated by the final partial remainder R(0) and the partial quotient c(1) as R(0)←R(0)−c(1)N.

Further, the step of transforming the final stage partial remainder R into a solution of A×B mod N comprises the steps of: (a) checking whether the final stage partial remainder R(0) is used as a multiplicand A for a succeeding modular multiplication computation; (b) if R(0) is used, substituting the remainder R(0) for A as A←R(0); (c) if R(0) is not used, checking whether R(0)≧0; (d) if R(0)≧0, ending the processing stage; and (e) if R(0)<0, substituting R(0) and the modulus N for R(0) as R(0)←R(0)+N, before ending the processing stage.

Further, to achieve the above-mentioned object, the modular multiplication system, according to the present invention, for executing a modular multiplication of A×B mod N on the basis of a radix number r comprises: (a) first register means (11) for storing a multiplicand A; (b) second register means (13) for storing a multiplier B; (c) third register means (15) for storing a modulus N; (d) fourth register means (17) for storing a partial remainder R; (e) normalizing means (21) responsive to said third register means for normalizing the modulus N; (f) parameter generating means (23) responsive to said first, second, third and fourth register means and said normalizing means, for generating partial multipliers b(k) and partial quotient c(k), where (k) denotes a number of processing stages from (k=⌊n/r⌋+1) to (o); (g) partial product generating means (31) responsive to said first register means and said parameter generating means, for generating partial products b(k)A; (h) modular subtracter generating means (33) responsive to said third register means and said parameter generating means, for generating modular subtracters c(k)N; (i) remainder updating means (35) responsive to said fourth register means, for updating remainder R(k); (j) carry save adder means (37) responsive to said partial product generating means, said modular subtracter generating means, and said remainder updating means, for executing carry save addition of R$_{new}$←r×(R$_{old}$−c(k)N)+b(−k)A to update the remainder R(k) stored in said fourth register means, where $R_{new}$ denotes an updated remainder; (k) carry propagation adder means (39) responsive to said carry save adder means, for executing carry propagation addition to update the multiplicand A stored in said first register means by $R_{new}$ and generating a solution of R(0)=A×B modulo N; and (l) sequence control means responsive to all said means, for sequentially controlling computational operations. The parameter generating means (23) comprises: (a) partial multiplier generating means (23A) responsive to said second register, for generating partial multipliers b(k) within a range of $-r/2 \leq b \leq r/2$; (b) partial quotient generating means (23B) responsive to said first, third and fourth register means and to said partial multiplier generating means, for generating partial quotient c(k) within a range of $-r/2 \leq c \leq r/2$; (c) comparative index generating means (23c) responsive to said first and third register means and said partial multiplier and quotient generating means, for generating comparative index l for determining a range in a modified Robertson diagram; and (d) comparator means (23D) responsive to said first and third register means, for comparing the multiplicand A with the modulus N to allow said partial multiplier and quotient generating means to generate b(k)=1 and c(k)=−1, respectively so that A is transformed to A−N through said partial product and modular subtracter generating means when $|A|>N/2$ or 2A−N>o. Further, in another embodiment, the modular multiplication lsystem, according to the present invention comprises (a) first means (41) for transforming a data A to A−N if $|A| \leq N/2$ and distributing data A, B, and N inputted through an input port, respectively; (b) second means (43) responsive to said first means, for storing the data A, B and N, generating partial multipliers b and partial quotient c within a range of $-r/2 \leq b, c, \leq r/2$ and partial remainders R, and executing carry-save multiply-and modulo-additions/subtractions of partial products bA and of modular subtracters cN to obtain the partial remainder R, respectively; (c) third means (47) for selecting output bits of the partial remainder R in correspondence to a bit length of the parallel output port and outputting the selected bits; (d) fourth means (49) for executing carry propagation addition of the obtained final remainder and outputting a solution of A×B modulo N through an output port; and (e) fifth means (45) for controlling operations of said first to fourth means.

The Baker method can reduce the quantity of data transferred between the computing elements and the memory unit. In this Baker method, however, since the radix number 2 for multiply additions is different from that 4 for division (modular) subtractions, it has been difficult to markedly decrease the computation stages or to increase the computational speed.

The gist of the present invention is to reduce the number of multiply additions and division (modular) subtractions on the basis of the same higher radix number. For instance, when a radix number 4 is selected, since partial products and modular subtracters can be computed two bits by two bits as shown in FIG. 1(C), it is possible to reduce the number of computational stages of additions/subtractions down to half of the conventional method. In general, when a radix number r is selected, the number of stages of additions and subtractions can be reduced down to $1/\log_2 r$.

When the present invention is compared with the Baker method, both the methods adopt the similar processing such that the partial remainder is updated by adding a partial product (which constitutes a multiply-addition stage) and a modular subtracter (which constitutes a modular-subtraction stage) to the partial remainder obtained as an intermediate result during computation processing.

In the Baker method, however, even if a higher radix number is adopted as it is, since the system configuration scale is determined so as to be applicable to the modular subtractions based on a higher radix number 4, it has been difficult to increase the computational speed in proportion to the hardware volume. This is because the Baker method has tried to solve the problem with respect to bit overflow from a limited computational range by increasing the radix number to 4 for only the modular subtractions without increasing the radix number 2 kept for the multiply additions.

The feature of the present invention is to adopt the same any given higher radix number for both the partial products and modular subtracters by the following methods:

(1) The modular subtracters are previously determined on the basis of the partial products at the succeeding stage, in order to reduce the absolute value of the partial remainder down to a value less than a modulus N. For instance, where the partial product at the succeeding stage is large, the partial quotient is determined large to reduce the partial remainder at the succeeding stage; and (2) The most significant bit of a multiplicand A is eliminated by changing the multiplicand A from a range of [0, N−1] to [−n/2, N/2], in order to reduce the absolute value of the partial products.

The above first feature serves to prevent bit overflow from a limited computational range and the second feature is a necessary condition to adopt the same radix number for both the partial products and the modular subtracters.

In summary, the feature of the present invention is to expand partial products and modular subtracters on the basis of the same higher radix number and further to determine the modular subtracters in anticipation of a carry at the succeeding stage. However, no carry propagation adders are incorporated in the system during intermediate computation stages.

In the present invention, therefore, the number of the prior-art additions and subtractions can be reduced by expanding computational operations on the basis of a higher radix r. In other words, additions and subtractions of a multiple of the modulus N are interposed between the two additions and/or subtractions for partial products to execute the modular multiplication in the same way as by Baker method shown in FIG. 1(B). In the present invention, however, since the number of bits of the intermediate remainders during the computation are limited within a predetermined computational range on the basis of any given radix r ($r \equiv 2^{r'}$, where r' is an integer); that is, since additions/subtractions are executed by shifting the bits toward the LSB by r' bits, being different from the Baker method in which additions/subtractions are executed by shifting a bit toward the MSB, it is possible to execute each addition and subtraction every any given r'-bit length (every bit in Baker method). Therefore, it is possible to reduce the number of additions and subtractions for multiplication down to 1/r' times; in other words, it is possible to increase the computational speed by r' times as compared with the prior-art method. In addition, since the system can be configured by the simple and same cells, the system can be simplified.

Further, since the two additions and/or subtractions can be executed simultaneously, being different from the Baker method by which the succeeding processing is determined by observing the sequentially executed current addition/subtraction results, it is possible to increase the speed twice. Further, when the entire system is formed within a single LSI, since no data stand-by processing is required, the system can be applied to a cryptographic system excellent in secrecy as well as in computational speed. Furthermore, the system can be simply extended to a larger scale by connecting additional cells in series.

BRIEF DESCRIPTION OF THE DRAWINGS

The features and advantages of the modular multiplication method and the system according to the present invention will be more clearly appreciated from the following description taken in conjunction with the accompanying drawings in which:

FIG. 10 is a computational bit arrangement diagram for assistance in explaining the invention method of $A \times B$ in 8-bit binary numbers;

FIG. 11 is a prior-art reference table for selecting two functions ($f_c$, $f_s$) in combination to generate partial multipliers $b(k)$;

FIG. 13 is a bit arrangement diagram of two multipliers $B_s$ and $B_c$ when represented in redundant form;

FIG. 14 is a reference table of the present invention for selecting two functions ($f_c$, $f_s$) in combination to generate partial multipliers $b(k)$;

FIG. 16 is an example of prior-art carry save adder composed of two full adders;

FIG. 17 is a flowchart showing a basic procedure of the method of executing $A \times B$ mod N according to the present invention;

FIG. 18(A) is a flowchart showing a first modification of transforming a multiplicand A within a smaller computational range;

FIG. 18(B) is a flowchart showing a second modification of transforming a multiplicand A within a smaller computational range;

FIG. 18(C) is a flowchart showing a third modification of approximately transforming a multiplicand A when a smaller computational range on the basis of higher significant bits of A and N;

DETAILED DESCRIPTION OF THE PREFERRED EMBODIMENTS

Embodiments of the modular multiplication method and the system according to the present invention will be described in detail hereinbelow with reference to the attached drawings. The basic conceptual system configuration and method will be described hereinbelow with reference to FIGS. 1(C), 2(A), 2(B), and 3.

The modular multiplication is to compute A×B modulo (mod) N, where A denotes a multiplicand; B denotes a multiplier; and N denotes a modulus. In the above computation, basically, the final remainder can be obtained by repeatedly executing the following formulae:

$$R_{new} \leftarrow r\,R_{old} + bA - cN \quad (A)$$

$$R_{new} \leftarrow r(R_{old} - cN) + bA \quad (B)$$

where $R_{new}$ denotes the updated or succeeding partial remainder; $R_{old}$ denotes the current partial remainder; ← denotes the substitution; r denotes the radix number; b denotes the partial multiplier obtained when the multiplier B is expanded on the basis of r-notation; c denotes the partial quotient determined by comparing boundary indices l (described later) obtained by A, N, b, and r with the partial remainder R' on the basis of a modified Robertson diagram (described later). In more detail, in the first formula (A), $rR_{old}+bA$ is represented by R'; the boundary indices $l_i$ is determined by the succeeding stage partial multiplier b; and the partial quotient c is determined by the $l_i$. In the second formula (B), $R_{old}$ is represented by R'; $l_i$ is determined by the present partial multiplier b; and the partial quotient c has previously been determined.

Figure 1:
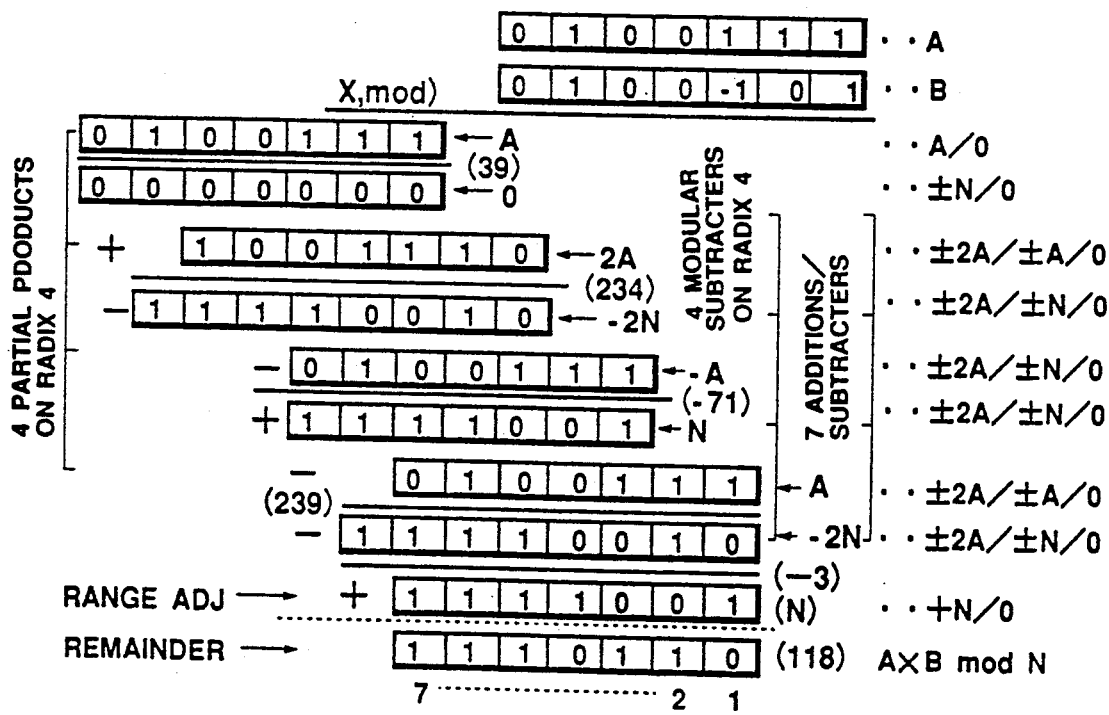
FIG. 1(A) is a computational bit arrangement diagram for assistance in explaining the conventional method of executing $A \times B$ mod N in 7-bit binary numbers.
FIG. 1(B) is the similar computational bit arrangement diagram for assistance in explaining the Baker method of executing $A \times B$ mod N in 7-bit binary numbers.
FIG. 1(C) is the similar computational bit arrangement diagram for assistance in explaining the invention method of executing $A \times B$ mod N in 7-bit binary numbers.

FIG. 1(C) is an example of computational bit arrangement diagram for assistance in explaining a computation of A×B mod N (39×93 mod 121) by the present invention in 7-bit binary numbers and a radix number of 4, in comparison with the conventional method and the Baker method shown in FIGS. 1(A) and 1(B). Here, it should be noted that the conventional method requires 7 multiply-additions of 7 partial products based on a radix number of 2 and 7 division-subtractions of 7 modular subtracters based on a radix number of 2; the Baker method requires 6 multiply-additions of 6 partial products based on a radix number of 2 and 7 division-subtractions of 7 modular subtracters based on a radix number of 4; and the invention method requires only 3 multiply-additions/subtractions of 3 partial products based on a radix number of 4 and 4 division-additions/subtractions of 4 modular subtracters based on a radix number of 4.

The feature of the invention method is to adopt the same higher radix number r for both the partial multipliers b and partial quotient within a range of $-r/2 \leq b$, $c \leq r/2$ in order to markedly reduce the number of computational stages (additions/subtractions), as described in further detail hereinbelow.

FIGS. 2(A) and 2(B) show a conceptual block diagram for executing the computational method of the present invention.

The modular multiplication system shown in FIG. 2(A) roughly comprises a register block 1, a control block 2 and an operating block 3. The register block 1 comprises an A register 11 for storing an input variable A (multiplicand), a B register 13 for storing an input variable B (multiplier), an N register 15 for storing an input variable N (modulus), and an R register 17 for storing work variables R (partial remainder) which is composed of an $R_{sum}$ register $17_s$ for storing a sum of R and an $R_{carry}$ register for storing a carry of R.

The control block 2 comprises an N normalizer 21 for normalizing the variable N, a control parameter generator 23 and a sequence controller 23 for controlling the entire sequential operations of the system.

Figure 24:
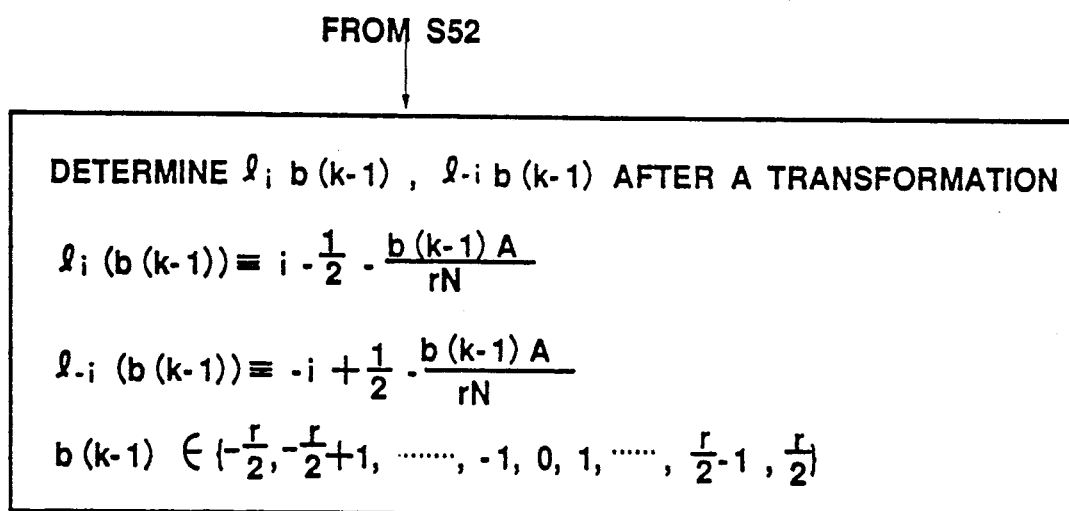
FIG. 24(A) is a flowchart showing a first modification of forming a partial quotient c on the basis of boundary indices l.
FIG. 24(B) is a flowchart showing a second modification of forming a partial quotient c on the basis of boundary indices determined approximately by higher significant bits of A, N and R.
FIG. 24(C) is a flowchart showing a third modification of forming a partial quotient c on the basis of boundary indices.
Figure 24:
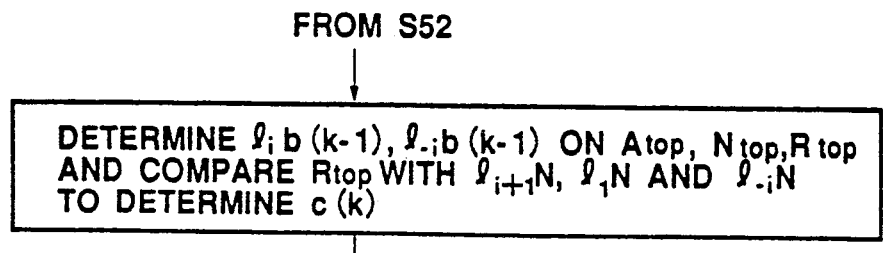
Figure 24:
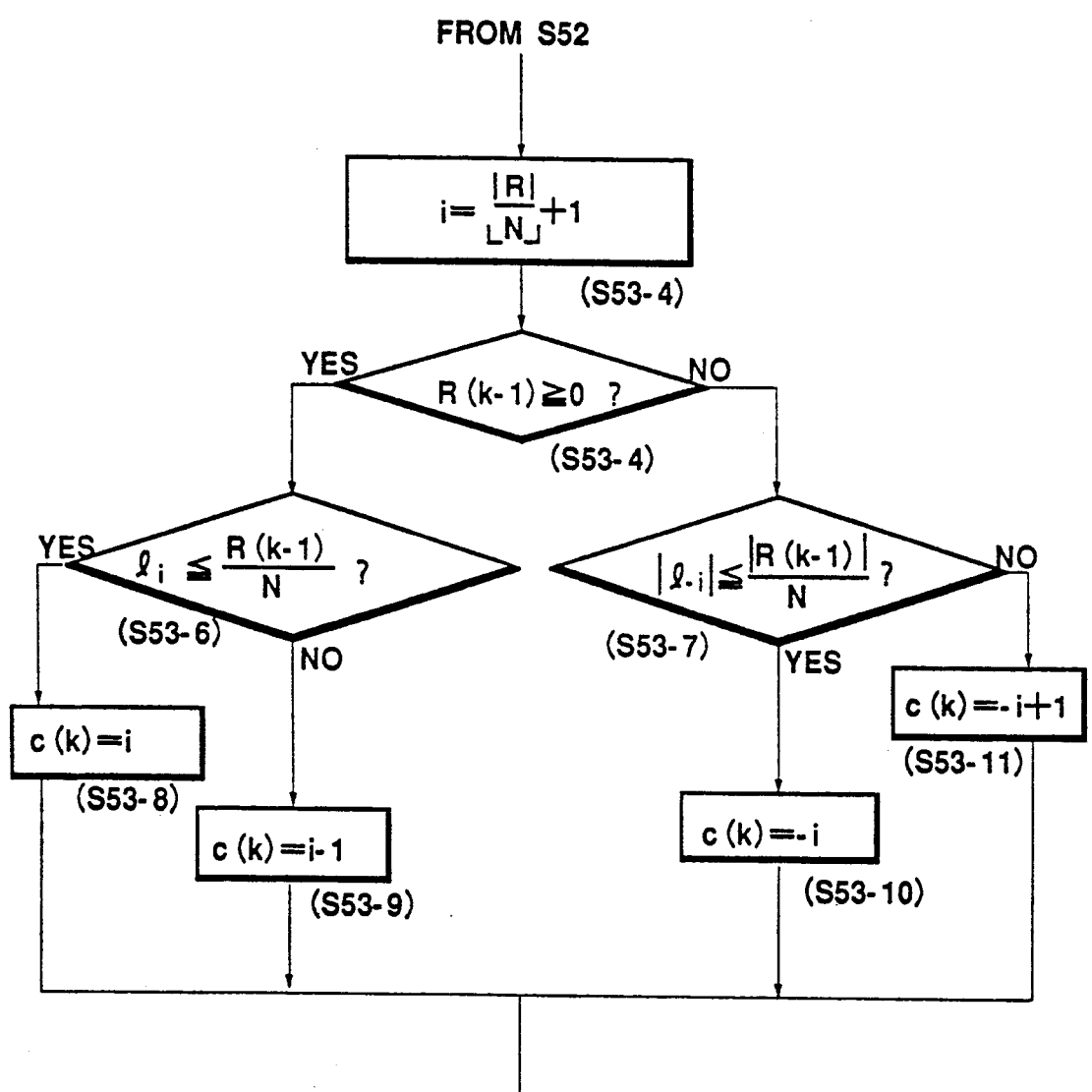

As shown in FIG. 2(B), the control parameter generator 23 comprises a b generator 23A for generating partial multipliers b on the basis of B as described later in further detail with reference to FIG. 23(A) to (E); a c generator 23B for generating partial quotients (modulus) c on the basis of A, N, R, b and l (boundary indices) as described later in further detail with reference to FIGS. 24(A) to (C); a boundary index generator 23C for generating boundary indices l on the basis of A, N, and b and supplying the generated boundary indices l to the c generator 23B as described later in further detail with reference to FIGS. 24(A) and (B); and a comparator 23D for comparing |A| and N/2 to allow the b generator 23A to generate b(k)=1 and the c generator to generate (ck)=−1, respectively so that A can be transformed to A−N through the bA generator 31 and the cN generator 33, when |A|≦N/2 or 2A−N<0.

The operating block 3 comprises a bA generator 31 for generating partial products bA on the basis of A and b; a cN generator 33 for generating modular subtracters cN on the basis of N and c; and an updated R generator 35 for generating an updated remainder R(k−1) on the basis of the partial remainders R(k) where k denotes the number of processing stages from k to o; a carry save adder 37 for updating $R_{old}$ to $R_{new}$ on the basis of bA, cN, and R, bit by bit, without carry propagation; and a carry propagation adder 90 for outputting a final remainder R(0) as a solution of A×B mod N.

In FIG. 2(A), the input multiplicand A inputted to the A register 11 is applied to the comparator 23D of the parameter generator 23 of the control block 2. If A>N/2, the parameter generator 23 operates so that the bA generator 31 outputs A; the cN generator 33 outputs −N; and the updated R generator 35 outputs 0. Therefore, the carry propagation adder 39 outputs a new A=A−N via the carry save adder 37. The updated A is stored in the A register 11 again so that A can be transformed from a range 0≦A<N to a range −N/2≦A<N/2 in order to prevent the bits from overflowing from a predetermined computational range.

The R register 17 for holding a partial remainders R is initialized by the sequence controller 25. Thereafter, the variables A, B and R stored in the A register 11, B register 13 and the R register 17 are supplied to the parameter generator 23 to generates b, c and R. Further, the bA generator 31, the cN generator 33 and the R generator 35 output bA, cN and R, respectively. These values are added by the carry save adder 37 bit by bit and the sum thereof is stored in the R register 17 as a new partial remainder R. The above steps are repeated n times corresponding to the number of bits of N.

Thereafter, when the final remainder R in the R register 17 is supplied to the parameter generator 23 of the control block 2, the bA generator 31, the cN generator 33 and the R generator 35 output 0, n or 0, and R, respectively. These values are added by the carry save adder 37 and then outputted from the carry propagation adder 39 by propagating a carry in sequence beginning from the least significant bit, through an output port. In summary, N is added according to the value of R, and R is transformed within a range 0≦R<N for modular multiplication.

As shown in FIG 1(C), when the radix number is r in the present invention, integer times additions or subtractions for modular subtractions are intercomputed between the additions or subtractions for partial products; the absolute values of the partial remainder R during computation are determined within a predetermined computational range in order to reduce the number of computational stages down to the number n of bits of N. Therefore, no data stand-by control is required; the speed can be increased; the circuit scale can be reduced; and the circuit design can be facilitated.

In this connection, the Baker method has been proposed by which additions for multiplication and subtractions for division are executed in sequence, as shown in FIG. 1(B). However, the computational speed of the present invention is higher than that of Baker. This is because in the present invention, the multiplicand A is previously transformed and further the addition or subtraction for modular subtraction is previously adjusted on the basis of the value of a partial product at the succeeding stage before added to the partial product. Therefore, the Baker method is executed by multiply-additions based on radix 2 and modular-additions/-subtractions based on radix 4, so that if the number of bits of a binary modulus N is n, n times operations are required. In contrast with this, in the present invention, since the multiplication and division can be executed by multiply- and modular-additions/subtractions based on the same radix 4, for instance, it is possible to reduce the operation times to half or to increase the computational speed twice. In general, if the radix number is r=2r' (r'≧1), the number of operations can be reduced down to 1/r' times.

Figure 3:
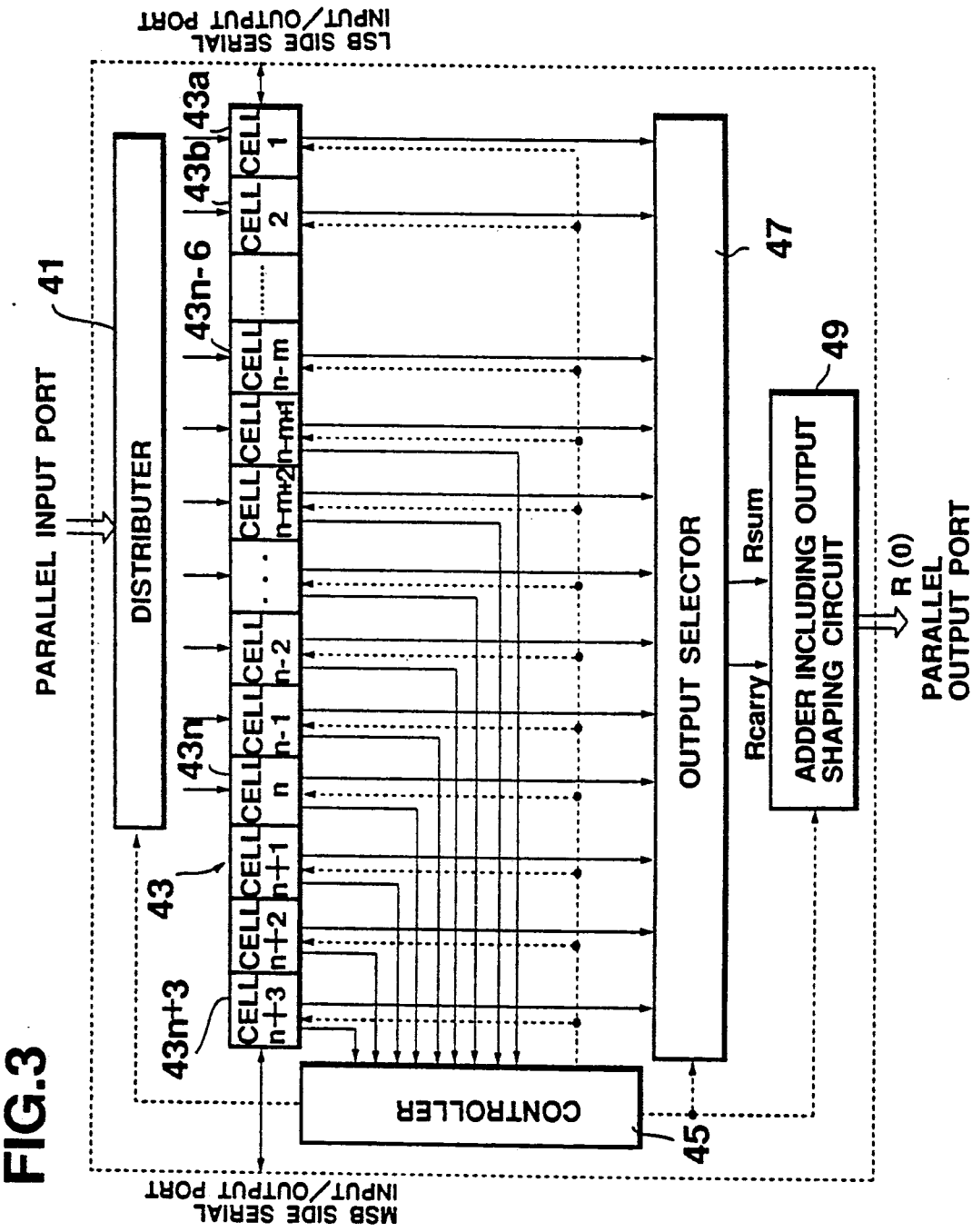
FIG. 3 is a block diagram showing an entire system configuration for assistance in explaining the method of executing $A \times B$ mod N computation of n-bit binary numbers.

FIG. 3 is a block diagram showing the entire configuration of the modular multiplication of the basic embodiment where the radix number 4. This system comprises first means of an input distributer circuit 41 for receiving input variables A, B, N through a parallel arranged input port and for distributing these data bit by bit; second means of operating sections 43 composed of a plurality of series-connected cells 43a, 43b . . . 43n+3 for executing additions, subtractions, bit shiftings, etc.; third means of output selector circuit 47 for sequentially selecting and outputting $R_{sum}$ and $R_{carry}$ stored in the operating section 43 beginning from the least significant bit according to the bit length of a parallel arranged output port; fourth means of an adder 49 including output shaping circuit for executing the final computational result of $R=R_{sum}+2R_{carry}$ on the basis of the internal outputs from the output selector circuit 47 and for outputting data through the output port; and fifth means of controller 45 for controlling the entire system operations.

The controller 45 stores a multiplier B and forms a partial multiplier b, reads remainders $R_{sum}$ and $R_{carry}$ stored in the cells arranged for higher significant bits in order to form a partial quotient c, and updates the values in the registers by new $R_{sum}$ an $R_{carry}$, after the entire processing has been completed. Further, when a carry is overflowed from an output bit length, the overflow carry is stored and added to the lower significant bits of the succeeding input data by the adder including output shaping circuit 49a.

Figure 4:
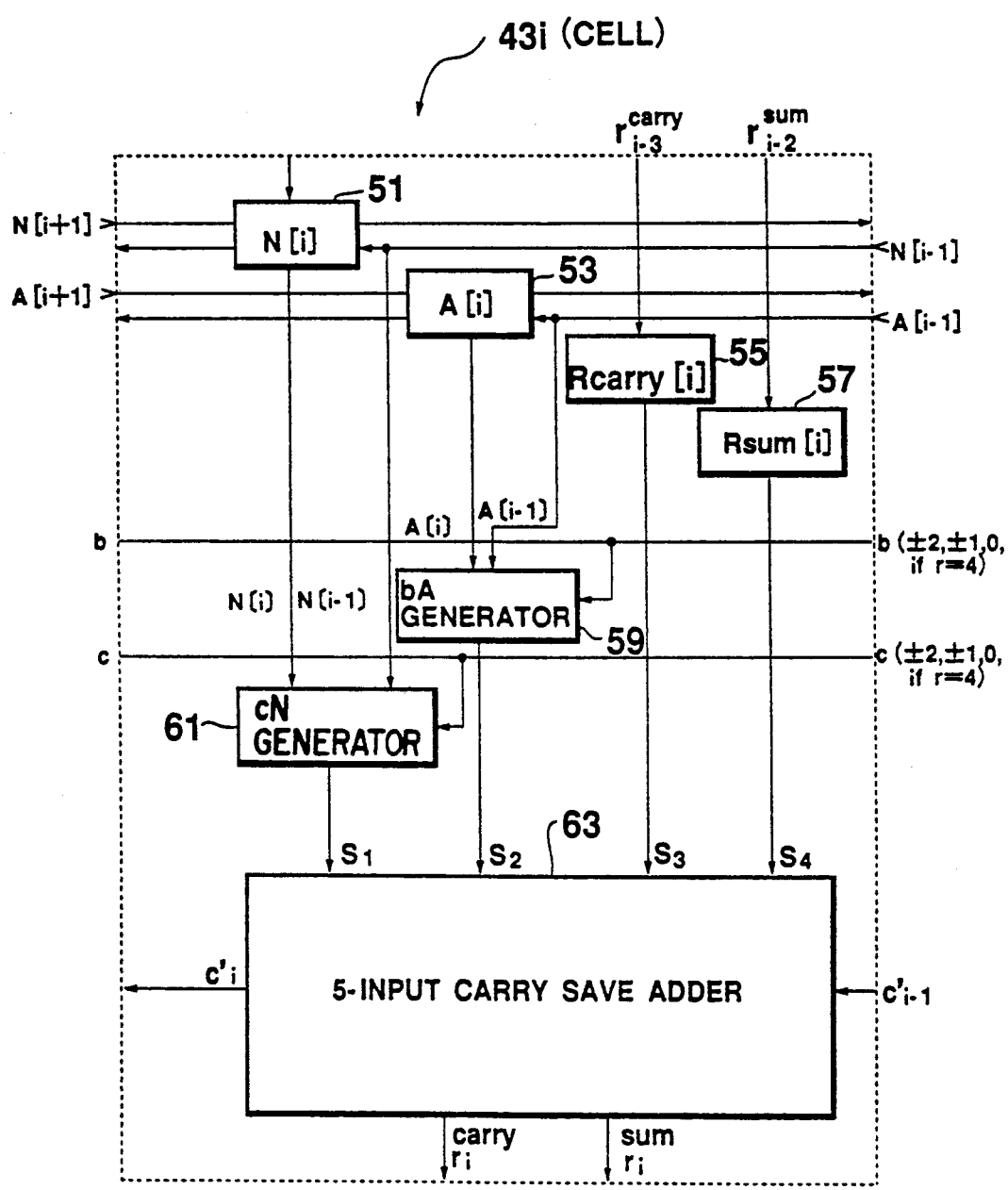
FIG. 4(A) is a block diagram showing a first embodiment of the cell configuration incorporated in the system shown in FIG. 3.
FIG. 4(B) is a block diagram showing a first modification of the carry save adder incorporated in the cell shown in FIG. 4(A)
FIG. 4(C) is a bit arrangement diagram for assistance in explaining an example of $A \times B$ mod N computational stages executed by the cells shown in FIGS. 4(A) and 4(B)
Figure 4:
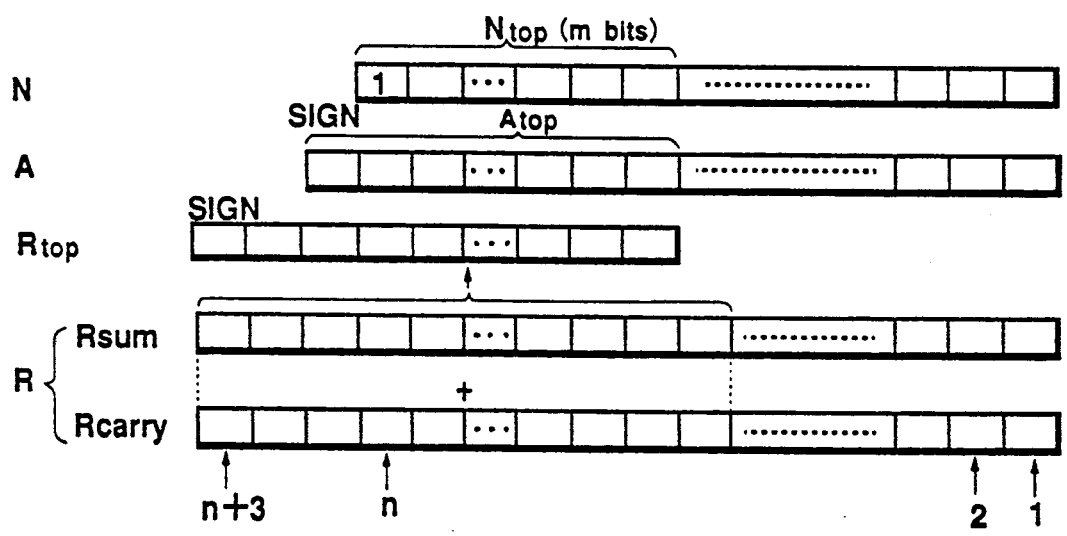

FIG. 4(A) is a block diagram showing a first embodiment of each cell incorporated in the modular multiplier system according to the present invention, which corresponds to the cell 63i shown in FIG. 3 for executing the afore-mentioned formula (A).

The cell shown in FIG. 4(A) comprises an N register 51 for holding N, an A register 53 for holding A, an $R_{carry}$ register 55 for holding $R_{carry}$, a $R_{sum}$ register 57 for holding $R_{sum}$, a bA generator 59 for forming a partial product bA, a cN generator 61 for forming a modular subtracter cN, and a 5-input carry save adder 63.

When the radix number r is 4, the bA generator 59 inverses and outputs A[i−1] if b=−2, inverses and outputs A[i] if b=−1, outputs a logical zero if b=0, outputs A[i] if b=1 and outputs A[i−1] if b=2. Further, the cN generator 61 provides the same function as with the bA generator 59, where i denotes an i-th bit from the least significant bit.

As shown in FIG. 4(B), the five-input carry save adder 63 comprises two full adders 65 and 67. With respect to the number of additions, this 5-input carry save adder 63 executes two additions simultaneously, that is, R=4R+bA−cN can be executed at a time by this adder 63.

In this invention, the 5-input carry save adders 63 arranged from the cell number (n+3) to (n−m+1) are so constructed as to add 4R+bA on the basis of the intermediate results $c_i'$; and $R(i)_{midsum}$ in order to form c. m is determined by the degree of accuracy. For instance, if r=4, m more than 5 is required.

By the system of the first embodiment as described above with reference to FIGS. 4(A) and (B), it is possible to execute the first embodiment of the modular multiplication method (A×B mod N) according to the present invention as follows. This method is mainly dependent upon the bit shifting operations of registers, as shown in FIG. 4(C).

A×B mod N (1st method)

Step 1 (Transformation)
  If N<2A, A←A−N
Step 2 (N normalization)
  Shift N and A leftward until MSB (the most significant bit) of N register becomes 1.
Step 3 (Initialization)
  R=0
Step 4 (Repetition)
  (Sequential subtractions from k=n/2+1 to 1)
  c←fc (4R+b(k)A, b (k−1), A)
  R←4R+b(k)A+cN
Step 5 (Final processing)
  If R<0, R←R+N
Step 6 (Returning of N)
  A←$R_{sum}$+2$R_{carry}$
  Shift N and A rightward by the same bits as in step 2 to obtain A Note 1:

$$b(k) = -2B[2k] + B[2k-1] + B[2k-2]$$

where B[i]>0; i>n or 0≧i; and B[i]=1; i>n if B has a minus sign.

Note 2: The method of deciding fc function is explained later.

In the above first method, R=$R_{sum}$+2$R_{carry}$ is defined. The additions are executed by the carry save adder except the final addition. For instance, to obtain R=R+bA, a new $R_{sum}$ is determined as $$R_{sum} \oplus 2R_{carry} \oplus bA,$$

and a new $R_{carry}$ is determined as a new Rcarry:

$$\{R_{sum} \cdot 2R_{carry}\} \vee \{2R_{carry} \cdot (bA)\} \vee \{(bA) \cdot R_{sum}\}$$

where ⊕ denotes the exclusive-OR operation; · denotes the logical product (AND operation); V denotes the logical sum (inclusive -OR operation). In this case, it is possible to use only the higher significant bits of N, A, R for approximation. That is, $N_{top}$, $A_{top}$ and $R_{top}$ are usable instead of N, A and R. Further, B[i] denotes an i-th bit from LSB.

In this first method, the N normalization step is added so that the modular multiplication can be executed by fixing the register bit length. In FIG. 2(A), the N normalization is executed by the N normalizer 21 of the control block 2 by sequentially shifting the N register 15 and the A register 11 leftward until the most significant bit of N becomes 1.

Further the step 6 indicates that the carry of the carry save addition result is propagated to obtain a final result and further the N normalization in step 2 is returned to the original N.

Figure 5:
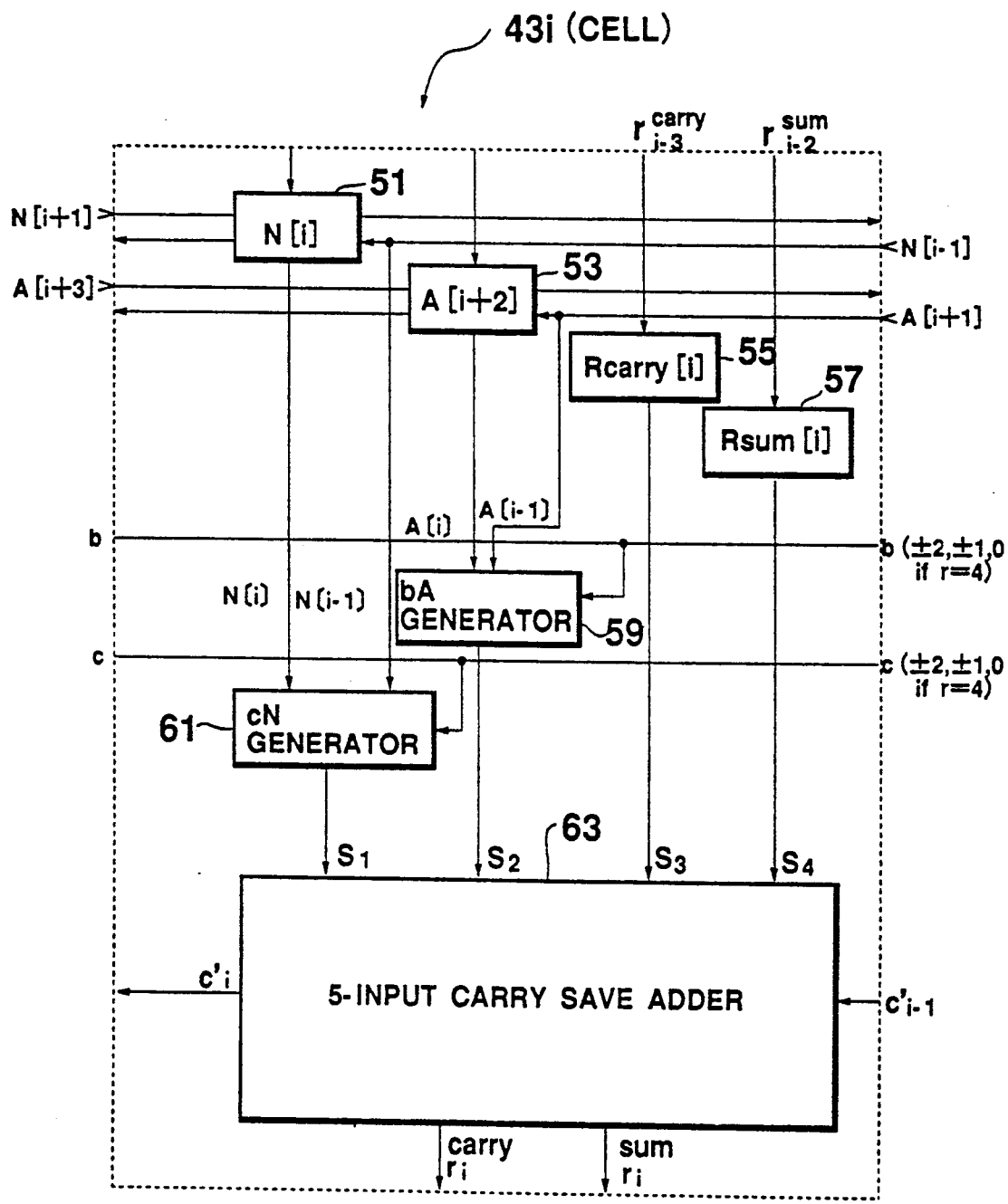
FIG. 5(A) is a block diagram showing a second embodiment of the cell configuration incorporated in the system shown in FIG. 3.
FIGS. 5(B)i and 5(B)ii are block diagrams showing a second modification of the carry save adder incorporated in the cell shown in FIG. 5(A)

FIG. 5a is a block diagram showing a second embodiment of each cell incorporated in the modular multiplication system according to the present invention, which corresponds to the cell 43i shown in FIG. 3 for executing the afore-mentioned formula (B).

The cell shown in FIG. 5(A) comprises a 5-input carry save adder 69 as shown in FIG. 5(B) instead of the carry save adder 63 shown in FIG. 4(A). However, it is also possible to use the 5-input carry save adder 63 in the cell shown in FIG. 5(A). Further, the A register 53 is shifted by two bits, being different from that shown in FIG. 4(A), this is because 4-times bA is not required.

The 5-input carry save adder 69 shown in FIG. 5(A) comprises two half adders 71 and 73, a full adder 75, two logical OR gates 77 and 79 and a logical AND gate 81. This 5-input carry save adder 69 executes two additions simultaneously, that is, calculates R=4(R−cN)+bA. Since the full adder 65 of the first embodiment shown in FIG. 4(B) is replaced with two half adders 71 and 73, the delay time can be reduced to ⅔ of the adder 65 for the first embodiment shown in FIG. 4(B).

In this second embodiment, since c is determined at the beginning of the computation, it is possible to incorporate the circuits as shown in FIG. 5(B), which is simple in circuit scale and high in computational speed.

By the system of the second embodiment shown in FIGS. 5(A) and 5(B), it is possible to execute the second embodiment of the modular multiplication (A×B mod N) according to the present invention. The first and second steps of this second embodiment are the same as those of the first embodiment.

A×B mod N (2nd method)

Step 1 (Transformation)
  If N<2A, A←A−N
Step 2 (N normalization)
  Shift N and A leftward until MSB of N becomes 1.
Step 3 (Initialization)
  R=0, c=0
Step 4 (Repetition)
  (Sequential subtractions from k=n/2+1 to 1)
  R←4 (R−cN)+b(k)A
  c←fc (r, b(k−1, A)
Step 5 (Final processing)
  R=R−cN
  If R<0, R=R+N
Step 6 (Returning of N)
  A=$R_{sum}$+2$R_{carry}$
  Shift N and A rigthward by the same bits as in step 2 to obtain A.

Note 1:

$$b(k) = -2B[2k] + B[2k-1] + b[2k-2],$$

where B[i]=0; i>0 or 0≧i; and B[i]=1; i>n if B has a minus sign.

Note 2: The method of deciding fc function is explained later.

This second embodiment is equivalent to the first embodiment mathematically. In the first embodiment, however, since the sum (4R+A) in step 4 is used for both updated c and R according to the case, it takes much time to determine c. In this second embodiment, however, the simultaneous processing is enabled by repeatedly delaying the partial modular subtracter cN bit by bit. However, the number of additions in the final processing increases once.

The method of deciding the function $f_c$ (R, b, a) will be described below:

fc (R, b, a) (1st deciding method)

Step 1 (According to the cases)

If $R_{top} < 0$, control proceeds to step 3.
Step 2 (If $R \geq 0$)
   fc←0
   If $R_{top} > N_{top}$, $R_{top} \leftarrow R_{top} - N_{top}$, and fc←1.
   If $l_1 \cdot N_{top} < R_{top}$, fc←fc+1
   control proceeds to step 4.
Step 3 (If $R < 0$)
   fc←0, $R_{top} \leftarrow -R_{top}$
   If $R_{top} > N_{top}$, $R_{top} \leftarrow R_{top} - N_{top}$, and fc←1.
   If $|l_{-1}| N_{top} < R_{top}$, fc←fc+1.
   fc←−fc.
Step 4
End Note 1. Boundary indices of $l_1$ and $l_{-1}$

| Case | 16 $l_1$ | $-16 l_{-1}$ |
|---|---|---|
| b = 0 | 8 | 8 |
| \|b\| = 1 | 8 ∓ 1' | 8 ± 1' |
| \|b\| = 2 | 8 ∓ 1'' | 8 ± 1'' | where the upper signs of ∓ and ± are used when ab>0, and the lower signs thereof are used when ab<0.

Note 2: 1' and 1'' are determined according to A after step 2 as follows:
$l' = 0$ ... $|A/N| < \frac{1}{8}$
$l' = 1$ ... $\frac{1}{8} \leq |A/N| < \frac{3}{8}$
$l' = 2$ ... $\frac{3}{8} \leq |A/N|$ ($\leq \frac{1}{2}$)

$l'' = 0$ ... $|A/N| < 1/16$
$l'' = 1$ ... $1/16 \leq |A/N| < 3/16$
$l'' = 2$ ... $3/16 \leq |A/N| < 5/16$
$l'' = 3$ ... $5/16 \leq |A/N| < 7/16$
$l'' = 4$ ... $7/16 \leq |A/N|$ ($< \frac{1}{2}$)

In this first deciding method, the value $(R+bA/4)/N$ is controlled so as to lie within a predetermined range from $-9/16$ to $9/16$. In addition, $|A/N|$ is classified according to two denominators 8 and 16 to simplify the boundary indices 1 for comparison. In this case, it is sufficient to compare 6 higher significant bits of N with 1.

fc (R, b, a) (2nd deciding method)
Step 1 (According to the cases)
If $Rs < 0$, control proceeds to step 3.
Step 2 (If $R \geq 0$)
   fc←0
   If $R_{top} > N_{top}$, $R_{top} \leftarrow R_{top} - N_{top}$ and fc←1.
   If $l_1 \cdot N_{top} < N_{top}$, fc←fc+1.
   control proceeds to step 4.
Step 3 (If $R < 0$)
   fc←0, $R_{top} \leftarrow -R_{top}$
   If $R_{top} > N_{top}$, $R_{top} \leftarrow R_{top} - N_{top}$, and fc←1.
   If $|l_{-1}| N_{top} < R_{top}$, fc←fc+1.
   fc←−fc.
Step 4
End Note 1: Boundary indices $l_1$ and $l_{-1}$ $l_1 = \frac{1}{2} - bA/4N$ $-l_{-1} = \frac{1}{2} + bA/4N$ are previously determined for each case of $b = 0, \pm 1$ or $\pm 2$.

In this second deciding method, in the same way as in the first deciding method, $(R+bA/4)/N$ is controlled so as to lie within a range from $-9/16$ to $9/16$, and this second deciding method is used when $\frac{1}{2} \pm (bA/4N)$ can be previously obtained precisely as the comparative indices. In this second deciding method, it is sufficient to compare fiver higher significant bits of N with the comparative index 1.

Figure 6:
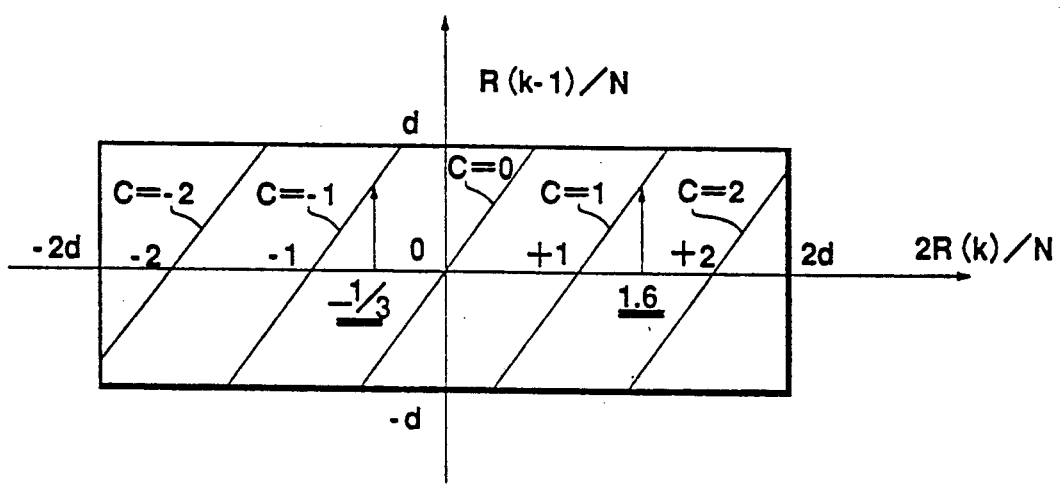
FIG. 6(A) is a basic conceptual Robertson diagram for assitance in explaining the method of selecting a partial quotient.
FIG. 6(B) is a first example of calculation of $A \times B$ mod N in 6-bit binary numbers (or decimal numbers) to facilitate understanding of the method of determining the partial quotient at the third stage R(3)

FIG. 6(A) shows a simplified Robertson diagram in which a group of lines ($c = \pm 2, \pm 1, 0$) with a gradient 45 degree is represented as a linear equation as follows:

$$R(k-1) = 2R(k) - cN$$

because $2R(k)/N$ corresponds to the abscissas (x-coordinates) and $R(k-1)/N$ corresponds to the ordinates (y-coordinates). Further, as shown the slope lines are limited within a window determined by $$\left| \frac{R(k-1)}{N} \right| < d \text{ and } \left| \frac{2R(k)}{N} \right| < 2d$$

which d denotes a boundary variable (described later in further detail).

The ordinary Robertson diagram for restoring binary division with an allowed digit set is disclosed in "Computer Arithmetic: Principles, Architecture, and Design" by Kai Hwang, School of Electrical Engineering Purdue University, John Wiley & Sons, New York, which is incorporated by reference herein.

FIG. 6(B) shows an example of the method of determining a partial modulus $c=1$ at the third stage R(3) when (45) is divided by (3) where ( ) denotes a decimal number.

FIG. 7(A) shows a modified Robertson diagram for assistance in explaining a method of deciding a partial quotient c by which the computation represented by the expression of $R_{new} \leftarrow r \times (R_{old} - cN) + bA$ can be executed without bit overflow from a predetermined computational range. In the ordinary Robertson diagram, $b=0$ because only division is handled.

In FIG. 7(A), lines having a gradient of 45 degrees represent integers c between $-r/2$ and $r/2$. These lines are determined within a window defined between $-rd$ and $rd$ in the axis of abscissa and between $[-d-bA/rN$ and $d-bA/rN]$ in the axis of ordinate. Here, 1 denotes a boundary index which represents a middle point of a range where two adjacent sloped lines are overlapped. The comparative index 1 moves right and left, because the succeeding partial multiplier b changes and therefore the window moves up and down. However, since the partial multiplier b is defined to an integer between $-r/2$ and $r/2$, and further the comparative index within negative ranges of $l_{-i}$ with respect to b corresponds to $-l_i$ with respect to $-b$, the previously obtained comparative indices can be restricted.

To determine the partial quotient $\hat{c}$, the present $\hat{R}/N$ value where $\hat{R}/N \leftarrow (r(R-cN)+bA)/N$ is calculated and then plotted on the axis of abscissa. That is, the partial quotient line $\hat{c}$ is determined by comparing $\hat{R}/N$ with the comparative index 1.

Further, the boundary variable d is determined (as explained later in Appendix (1)) as follows:

$$d = \frac{1}{2} + 1/\{4(r-1)\}.$$

FIG. 7(B) shows a modified Robertson diagram when the radix number r=4, by way of example.

FIG. 7(C) shows a modified Robertson diagram for assistance in explaining the basis of the first and second embodiments, which represents an intermediate state of the repeated computations. Here, R(k) denotes the present remainder and R(k−1) denotes the succeeding remainder. The abscissa represents a value of (4R(k)+b(k)A)/N which corresponds to an addition of partial products in FIG. 1(C), and the ordinate represents the succeeding remainder R(k−1)/N. A partial quotient c(−2 to 2) can be determined by the graphs. Here, the graph can be expressed as $$R(k-1) = 4R(k) + b(k)A - cN,$$

where $-9/16 - \{b(k-1)A\}/4 < \{R(k-1)\}/N < 9/16 - \{b(k-1)A\}/4$.

These graphs are lines with a gradient 45 degrees and intersect the axis of abscissa at 0, ±1, ±2.

The graphs lie between −9/4 and 9/4 on the abscissa and between −9/16−b(k−1)A/4N and 9/16−b(k−1)A/4N on the ordinate. As a result, R+bA/4 lies always within a range from −9/16 to 9/16.

On the other hand, the graph representation range(-window) changes according to the value bA. In the case of the fc function deciding methods, when A is about N/2, the boundary index $l_1$ between c=0 and c=−1 is ¼ if b=0, however, shifted to ⅜ if b=2 and A is positive.

In decision of the function fc, since the boundary regions (where a two-valued function is shown with respect to the abscissa) has a width of ⅛, it is possible to determine c by comparing the higher significant bits of R(k) with the higher significant bits of N under consideration of a sign of A, without computation of (4R(k)+b(k)A)/N.

The basis of the precision and the boundary variable d for comparison will be explained below.

First, the reason why the absolute value of (R+bA/4)/N is set to 9/16 or less will be described.

A remainder R lies always within a range of $$-d - bA/4N \leq R/N \leq d - bA/4N, \quad d > 0 \qquad (1)$$

Here, to obtain c=−2, −1, 0, 1 and 2, $$2 - d - bA/4N < 4d < 2 + d - bA/4N \qquad (2)$$

must be satisfied.

Further, since A of 0≦A<N is transformed into A of $$|A| \leq N/2 \qquad (3)$$

when the expressions (1), (2) and (3) are classified according to the ranges of b=−2, −1, 0, 1, 2, $$7/20 \leq d \leq 7/12 \qquad (4)$$

is obtained.

However, since $$2d > 1 \qquad (5)$$

is necessary to obtain a two-valued function so that two graphs are overlapped at the adjacent graph boundaries.

$$½ < d \leq 7/12 \qquad (6)$$

can be derived from the expressions (4) and (5). Therefore, d can be selected from a fraction lying within this range of the expression (6).

To facilitate the precision calculation, if the minimum value of a fractions having a denominator of $2^e$ is selected among the fraction which represents d, $$d = 9/16 \qquad (7)$$

is determined.

Next, the basis that the number of bits of $N_{top}$ and $R_{top}$ is determined for comparison will be explained. From $$R_{top}/(N_{top}+1) < R/N < (R_{top}+1)/Ns \qquad (8)$$

$$|R/N - R_{top}/N_{top}| < 1/N_{top} \qquad (9)$$

can be derived.

Therefore, if $N_{top}$ is m bits, since $$N_{top} \geq 2^{m-1} \qquad (10)$$

the error is $2^{1-m}$ or less.

Here, in the case of the second fc deciding method, since the allowable error range is about 1/16 with its boundary index as its center, $$m \geq 5 \qquad (11)$$

is necessary.

On the other hand, in the case of the first fc deciding method, since the allowable error range is about 1/16 −1/32=1/32 with its boundary index as its center $$m \geq 6 \qquad (12)$$

is required.

Figure 7:
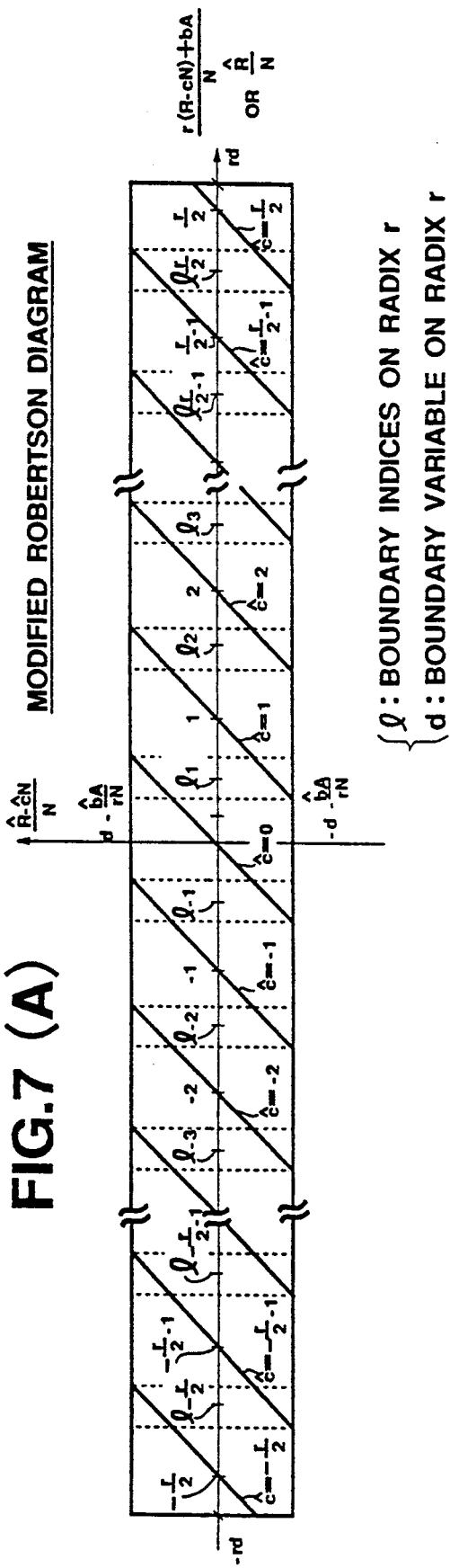
FIG. 7(A) is a modified Robertson diagram when the radix number is r.
FIG. 7(B) is another modified Robertson diagram when the radix number is 4.
FIG. 7(C) is an exemplary modified Robertson diagram obtained during a computational processing stage when the radix number is 4.
Figure 7:
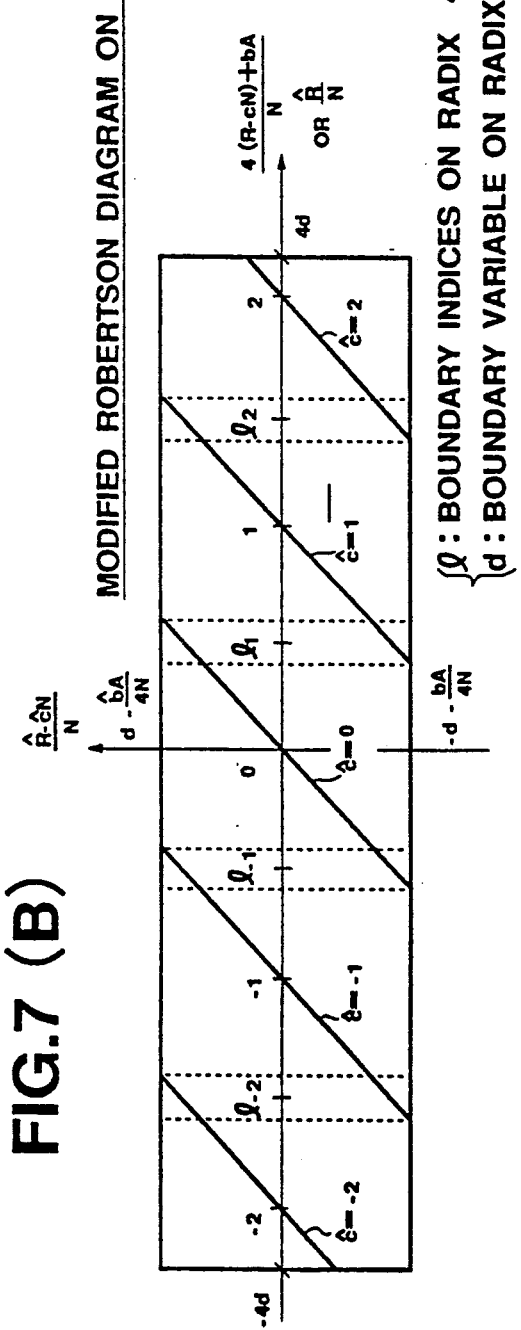
Figures 7, 8:
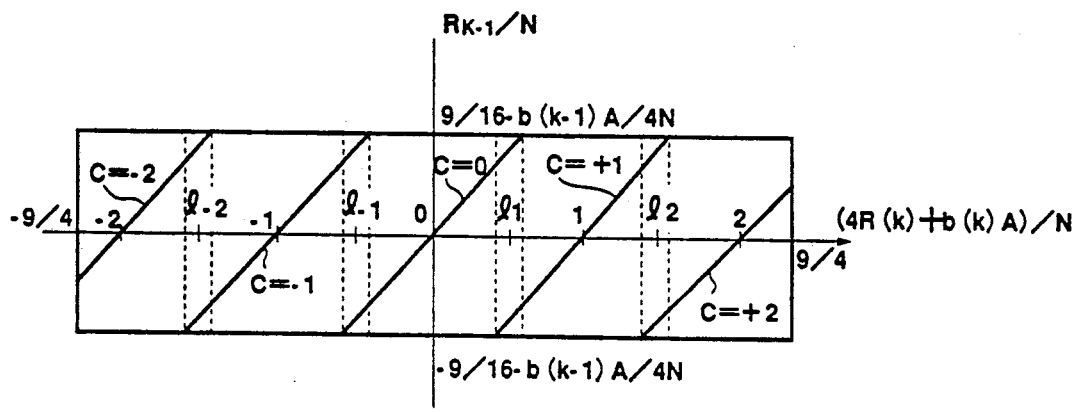
FIG. 8 is a table for comparison between the Baker method and the invention method in the number of stages required for multiply- and modular-additions/-subtractions.

FIG. 8 is a table for comparing the computational speed between the present invention and the Baker method in modular multiplication, in which the numbers of repeated additions and subtractions are compared by use of n-bit length operating circuits. For instance, when the average bits of B distribute as 1 or 0, and n denotes a bit length of a modulus N, Baker method required n/2 multiply additions/subtractions and 3n/4 modular additions/subtractions and therefore 5n/4 additions/subtractions in total on an average, and similarly n multiply and modular additions/subtractions and therefore 2n additions/subtractions in total at the maximum. On the other hand, the method of the present invention requires 3n/8 multiply and modular additions/siubtractions and therefore 3n/4 additions/subtractions in total on an average and similarly n/2 multiply and modular additions/subtractions and therefore n multiply and modular additions/subtractions in total at the maximum. This indicates that the computational speed of the invention method is 1.7 times higher than the Baker method on an average and twice higher than the Baker method at the maximum.

Figure 9:
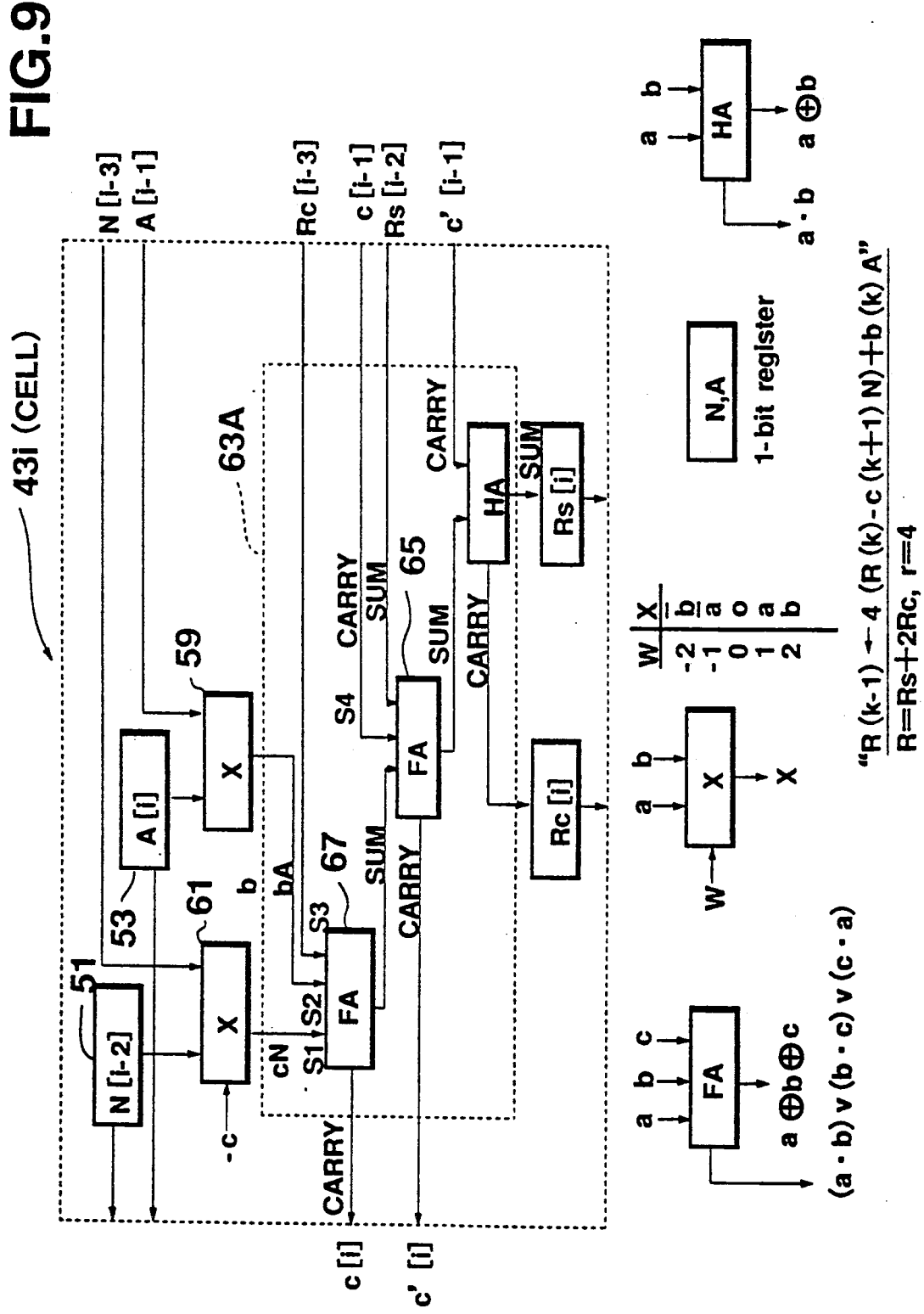
FIG. 9(A) is a block diagram showing a third embodiment of the cell configuration incorporated in the system shown in FIG. 3, in which the partial remainder is represented in redundant form.
FIG. 9(B) is a block diagram showing a fourth embodiment of the cell configuration incorporated in the system shown in FIG. 3, in which the partial remainder is represented in redundant form so as to be suitable for $A^{\ominus}$ mod N computation (modular exponentiation)
Figure 9:
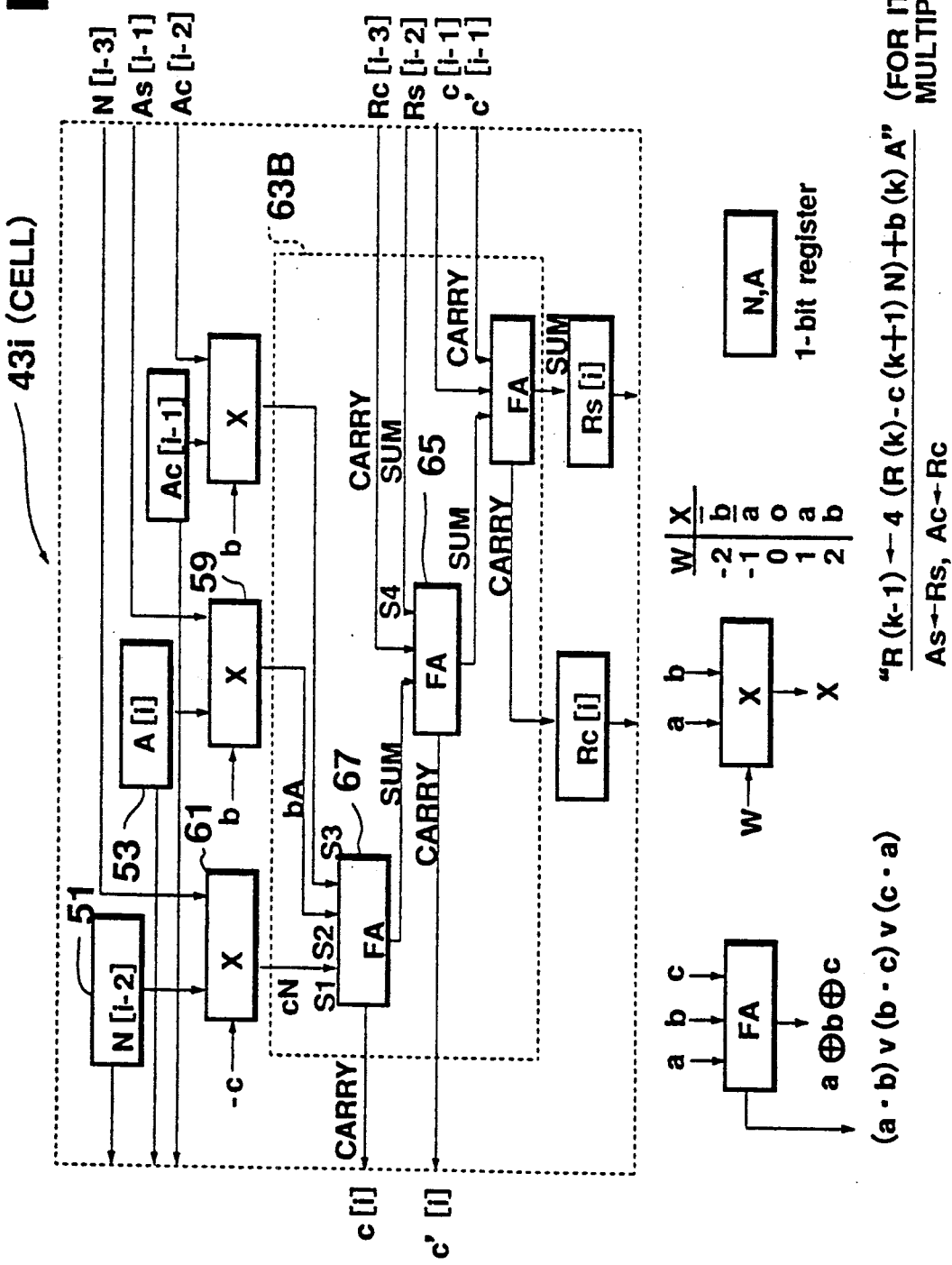

FIG. 9(A) is a block diagram showing a third embodiment of each cell 43$i$ incorporated in the modular multiplication system according to the present invention shown in FIG. 4(A), in which the partial remainder R represented in redundant form can be directly substituted for a multiplier B at the succeeding processing stage. In FIG. 9(A), a carry save adder 63A applicable to a radix number of 4 is shown. Further, when any given radix number r is adopted, (n+r′) piece cells 43$i$ must be connected in series into an array form to realize a r-radix modular multiplication system. By means of the cells shown in FIG. 9(A), the following third method caan be executed.

A×B mod N (3rd method)

Here, when R is represented redundantly as $$R = R_s + 2R_c$$

an addition of R+X can be replaced, on the basis of the redundant representation principle, with $$R_s \leftarrow R_s \oplus 2R_c \oplus X$$

$$R_c \leftarrow R_s \cdot 2R_c \vee \{X \cdot (R_s \vee 2R_c)\}$$

where $\oplus$ denotes exclusive OR; • denotes the logical product; and V denotes the logical sum.

In this third embodiment, the computation of the expression of $R_{new} \leftarrow r \times (R_{old} - cN) + bA$ can be executed by the carry save adder 63A which can eliminate the carry propagation times.

FIG. 9(B) is a block diagram showing a fourth embodiment of each cell 43i incorporated in the modular multiplication system according to the present invention shown in FIG. 4(A), in which the partial remainders R represented in redundant form can be directly substituted again for a multiplier B at the succeeding stage and further the multiplicand A is also represented in redundant form. By means of the cells shown in FIG. 9(B), the following fourth method can be executed.

A$^e$ mod N (4th method)

In the case of modular exponentiation (modular power multiplication), the computational result is used as the succeeding multiplicand. Therefore, when a high-speed modular exponentiation is required, it is preferable to determine the modular multiplication result of the redundant representation as the multiplicand of the succeeding modular multiplication without carry propagation. This method can be realized by arranging a plurality of (n+r') cells as shown in FIG. 9(B), in which the radix number r=4, r=2$^{r'}$ (because r=2$^{r'}$). Further, the following substitutions are executed at the final stage as $$A_s \leftarrow R_s$$

$$A_c \leftarrow R_c$$

Figure 2:
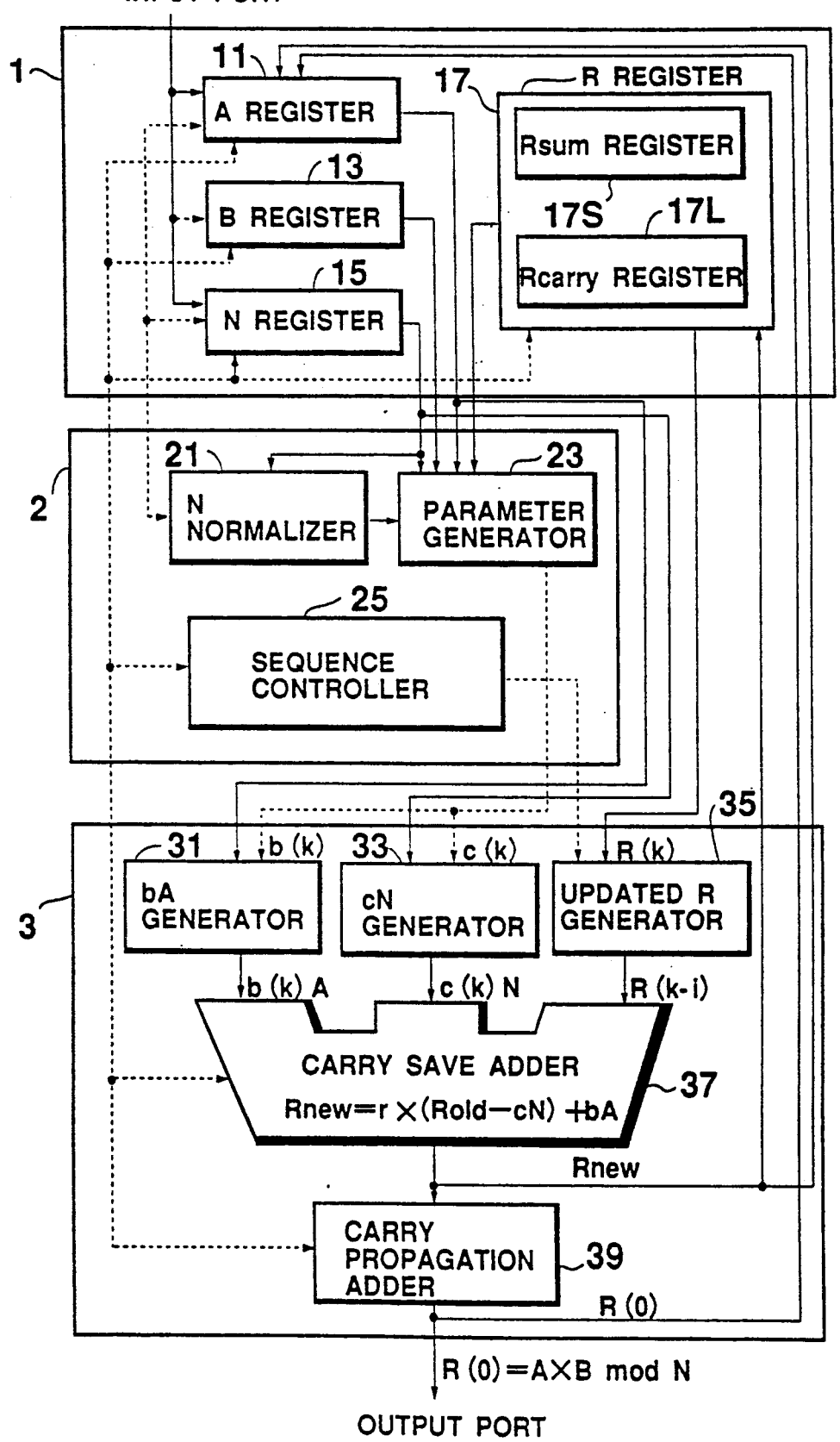
FIG. 2(A) is a block diagram showing a basic system configuration for assistance in explaining the concept of the method of executing $A \times B$ mod N of the present invention.
FIG. 2(B) is a block diagram showing a parameter generator incorporated in the system shown in FIG. 2(A)

Other embodiments of the modular multiplication method according to the present invention by means of the system shown in FIGS. 2 and 3 will be described hereinbelow.

A×B mod N (5th method)

Step 1 (Initialization)
(1) If N<2A, A←A−N
(2) n←⌊log$_2$(N)⌋+1
(3) k←⌈n/r'⌉+1 (r=2$^{r'}$, r'≧1)
(4) R(k)←0
(5) c(k+1)←0

Step 2 (Repetition of ⌈n/r'⌉+1 times)
(1) R(k−1)←r×{R(k)−c(k+1)N}+b(k)A
(2) c(k)←fc(R(k−1), b(k−1))
(3) k←k−1

Step 3 (Final processing)

(1) R(0)←R(0)−c(1)N
(2)
A←R(0) (If R(0)≧0)
A←R(0)+N (If R(0)<0)

Here, the function is executed as follows;

fc(R, b):
fc←i (If l$_i$N<R≦l$_{i+1}$N)
fc←0 (If l$_{-1}$N≦R≦l$_1$N)
fc←−i (If l$_{-i-1}$N≦R<l$_{-i}$N)

Here, the comparative index l is a midpoint at a region where two lines are overlapped on the axis of abscissa in FIG. 7; $l_i = i - \frac{1}{2} - bA/rN$, $l_{-i} = -i + \frac{1}{2} - bA/rN$; b is an integer within a range between −r/2 and r/2; i is an integer within a range between 1 and r/2. Both the integers b and i are previously determined.

As described above, in this embodiment, the comparative indices can be determined simply.

A×B mod N (6th method)

In this embodiment, the function fc is compared in accordance with an approximate processing method.

When the bit length n of A, B, and N increases, the bit length required for comparison between R and the comparative index l increases to determine the function fc. Therefore, in this case, only the several higher significant bits are compared as follows:

Function fc (R, b):

fc←i (if L$_i$N$_{top}$<R$_{top}$≦L$_{i+1}$N$_{top}$ fc←o (if L$_{-1}$N$_{top}$<R$_{top}$≦L$_1$N$_{top}$ fc←−i (if L$_{-i-1}$N$_{top}$<R$_{top}$<L$_{-i}$N$_{top}$ where
L$_i$ = i − ½ − bA$_{top}$/rN$_{top}$,
L$_{-i}$ = −i + ½ − bA$_{top}$/rN$_{top}$
−r/2≦b≦r/2, where b is an integer
1≦i≦r/2, where is an integer
N$_{top}$ denotes x or more significant bits of N
A$_{top}$ denotes x or move significant bits of A
R$_{top}$ denotes x or more significant bits of R Since A and R have a sign, A$_{top}$ and R$_{top}$ also have a sign (±).

Further, the above value x can be determined, as described later in Appendix 2, as follows:

$$X = \lceil \log_2\{(r-1)(rd+2)\}\rceil + 3$$

where ⌈y⌉ denotes a minimum integer more than y.

In the above-mentioned sixth embodiment, the comparison between the comparative index with the partial remainder R can be attained by comparing only several higher significant bits of li and R.

A×B mod N (7th method)

In this embodiment, N is transformed in accordance with an approximate processing method.

When all the bits of N and 2A are compared with each other in the fifth embodiment at step 1 (1), the computational speed and the hardware volume increase with increasing n (bits).

In this case, N$_{top}$ and 2A$_{top}$ are compared instead of comparison between N and 2A. In the same way as in the function fc, N$_{top}$ denotes y higher significant bits of N, and A$_{top}$ denotes A lying beyond a range of N used for forming the $N_{top}$. Further, since A has a sign, $A_{top}$ also has a sign.

If $|A_{top}/N_{top} - A/N| < 2/N_{top}$,
$2A_{top}$ is compared with $N_{top}$.
If $2A_{top} > N_{top}$ is determined,
$A \leftarrow A - N$ is executed, so that
$|A/N| < |A_{top}/N_{top}| + 2/N_{top} < \frac{1}{2} + 2/N_{top}$
is obtained. Therefore, $$d = \tfrac{1}{2} + (1 - 4/N_{top})/4(r-1)$$

can be obtained. Here, since the most significant bit of N is 1, $$d = \tfrac{1}{2} + (1 - 2^{3-y})/4(r-1)$$

is selected.

As a result, since d becomes smaller than the original d, when this embodiment is utilized together with the 2nd embodiment, x and y are selected in the relationship of $$x = \lceil \log_2 (r-1)(rd+2)/(1-2^{3-y}) \rceil + 3$$

In this 6th embodiment, it is possible to reduce the number of bits required for comparison of $2A > N$ for transformation of A.

APPENDIX

The derivation of the comparative boundary variable d (in the basic configuration) and the higher significant bits x of $N_{top}$ and $R_{top}$ (in the 6th embodiment) will be explained hereinbelow:

(1) Derivation of boundary variable d (In the case of radix 4)

In FIG. 7(B), the comparative boundary variable $d = 7/12$ is defined as follows:

The necessary conditions that the graph is continuous with respect to the axis of abscissa are expressed as $$d > \tfrac{1}{2} \tag{22}$$

The condition that $(4R + bA)/N$ is within a range between $-4d$ and $4d$ on the axis of abscissa is $$4d \leq 2 + d - |bA|/4N \tag{23}$$

Here, since $|b| \leq 2$ and $|A| \leq N/2$, the expressions (22) and (23) can be transformed as $$\tfrac{1}{2} < d \leq 7/12 \tag{24}$$

Thus, $d = 7/12$ (25)

can be obtained.

(In the case of a general radix r)
In the same way as the expression (23),
$$rd \leq r/2 + d - |bA|/rN \tag{26}$$

can be obtained with respect to the general radix r.

On the other hand, since $|b| \leq r/2$, $|c| \leq r/2$ and $|A| \leq N/2$, $$d = \tfrac{1}{2} + \tfrac{1}{4}(r-1) \tag{27}$$

can be obtained.

(2) Derivation of x higher significant bits of N or R for comparison

Definition
$\hat{R} \equiv rR + bA$
$N_{top} \equiv$ x higher significant bits of N
$A_{top} \equiv$ x higher significant bits of A
$\hat{R}_{top} \equiv (x + \log_2 r)$ higher significant bits of $\hat{R}$ However, x is a positive integer, and $b \equiv b(k)$.
(In the case of a radix 4)

In FIG. 7(B), the index $l_1$ between $c = 0$ and $c = +1$ can be expressed as $$l_1 \equiv \tfrac{1}{2} - \hat{b} \cdot A/4N \tag{28}$$

where $\hat{b} = b(k-1)$

L1 can be defined as an approximate value of the boundary index l1 by the following expression as $$L1 \equiv \tfrac{1}{2} - \hat{b} \, A_{top}/4N_{top} \tag{29}$$

If $\epsilon \leq \delta - \delta'$ (30)

where
$$\epsilon \equiv |R/N - R_{top}/N_{top}| \tag{31}$$

$$\delta \equiv d - \tfrac{1}{2} = 1/12 \tag{32}$$

$$\delta' \equiv |L_1 - l_1| \tag{33}$$

can be satisfied, it is possible to replace the comparison of the boundary index $l_1$ with R of n-bit length with the comparison of L1 with $R_{top}$.

Further, if $R/N \leq rd = 7/3$ is used, the expression (31) can be transformed into $$\epsilon \leq |(R_{top} + 1)/N_{top} - R_{top}/(N_{top} + 1)| < 10/3N_{top} \tag{34}$$

If $|b| \leq 2$, the expression (33) is $$\delta' < 2|b|/4N_{top} \leq 1/N_{top} \tag{35}$$

Therefore, $$N_{top} \geq 52 \tag{36}$$

can be derived from the expressions (30), (32), (34) and (35).

Since the most significant bit of $N_{top}$ is always 1, $$N_{top} \geq 2^{x-1} \tag{37}$$

As a result, the minimum value x is selected under the conditions that the expressions (36) and (37) are satisfied as $$x = 7 \tag{38}$$

The same expression (38) can be sufficiently applied to $l_2$, $l_{-1}$ and $l_{-2}$.

(In the case of the general radix r)
In the same way, the following expression can be obtained as $$N_{top} \geq 4(r-1)(rd+2) \tag{39}$$

Therefore, the minimum value x can be expressed as $$X = \lceil \log_2 \{(r-1)(rd+2)\} \rceil + 3 \tag{40}$$

A system and a method of executing a multiplication A×B (A: multiplicand; B: multiplier) will be described hereinbelow, which is effective in executing modular exponentation (power multiplication) such as $M^e$ mod N (where e denotes the exponent).

A multiplication is necessary to basically repeat a number of additions. If the bit length increases, the computational speed is reduced due to the presence of carry propagation in additions. FIG. 1(A) shows an example in which a multiplication A×B is obtained by shifting the multiplicand A bit by bit according to each bit of the binary multiplier B in the conventional method.

To increase the computational speed of the multiplication, a method of utilizing a carry save adder by which each bit of a multiplicand A and each bit of a multiplier B are added independently irrespective of bit length is known. In this method, the variable X is represented by a redundant representation as $$X = X_s + 2X_c.$$

When Y is added to X, $$((2X_c) \cdot X_s) \lor (X_s \cdot Y) \lor (Y \cdot (2X_c)) \oplus X_s \oplus Y,$$

are executed and the value x is updated by $X_c$ and $X_s$, as follows:

$$X \leftarrow X_s + 2X_c$$

where "·" denotes the logical product; "V" denotes the logical sum; "⊕" denotes the exclusive logical sum; and "←" denotes the substitution.

In the case of FIG. 1(A), the partial products can be obtained by shifting bits of A in place of Y and by adding each bit of two partial products bit by bit through carry save adders, and after the final carry save addition has been completed, a carry propagation addition of $X \leftarrow X_s + 2X_c$ is executed, where necessary, to form a single representation value X.

In this method, however, since the carry propagation addition is executed after the final stage carry save addition has been completed, when exponentiation or power multiplications such as A←A×B or B←B×B are repeatedly executed, the carry propagation additions for each multiplication inevitably reduce the computational speed.

To improve the above conventional method, when the result of the final stage carry save adder is used as a multiplier, a method of executing multiplications on the basis of redundant representation without executing carry propagation additions has been proposed, as disclosed by "On a Fast Iterative Multiplication Method by Recording Intermediate Products" by Takagi and Yajima, Information Processing Transaction No. 36 (1986) (4c-1). In this method, binary multipliers of either of (−2, −1, 0, 1, 2) are directly generated two bits by two bits. That is, in the case of FIG. 1(A), any one of partial products of (−2A, −A, 0, A, 2A) is formed by shifting the bits, where (−2) represents the one-bit left shift of A and forming a twos complement; (−1) represents forming a twos complement; (0) represents outputting of zero; (1) represents non-transformation; and (2) represents one-bit left shift, respectively. In the case of FIG. 10, for instance, the partial products are added by shifting the multiplicand A leftward two bits by two bits.

To obtain a product A×B of two variables A and B, the multiplier B is redundantly represented as $B = B_s + 2B_c$, and $B_s$ or $B_c$ is represented as $B_s[1]$, $B_s[2]$, ... in the order from the least significant bit. In this case, the method of Takagi et al forms two functions ($f_c$, $f_s$) with reference to the table shown in FIG. 11 to form partial multipliers two bits by two bits. In FIG. 11, however, since there are four selecting positions where a slush indicating and/or is present, it is necessary to determine $f_s$ on the basis of the lower significant bits. Further, it is necessary to determine a multiplier of $f_c$ and $f_s$ two bits by two bits on the basis of the more lower significant bits because $f_c$ must be decided. Therefore, there exists a problem in that the memory access control for data is complicated in order to determine selective functions and therefore the computational speed decreases and the hardware volume increases.

Figure 12:
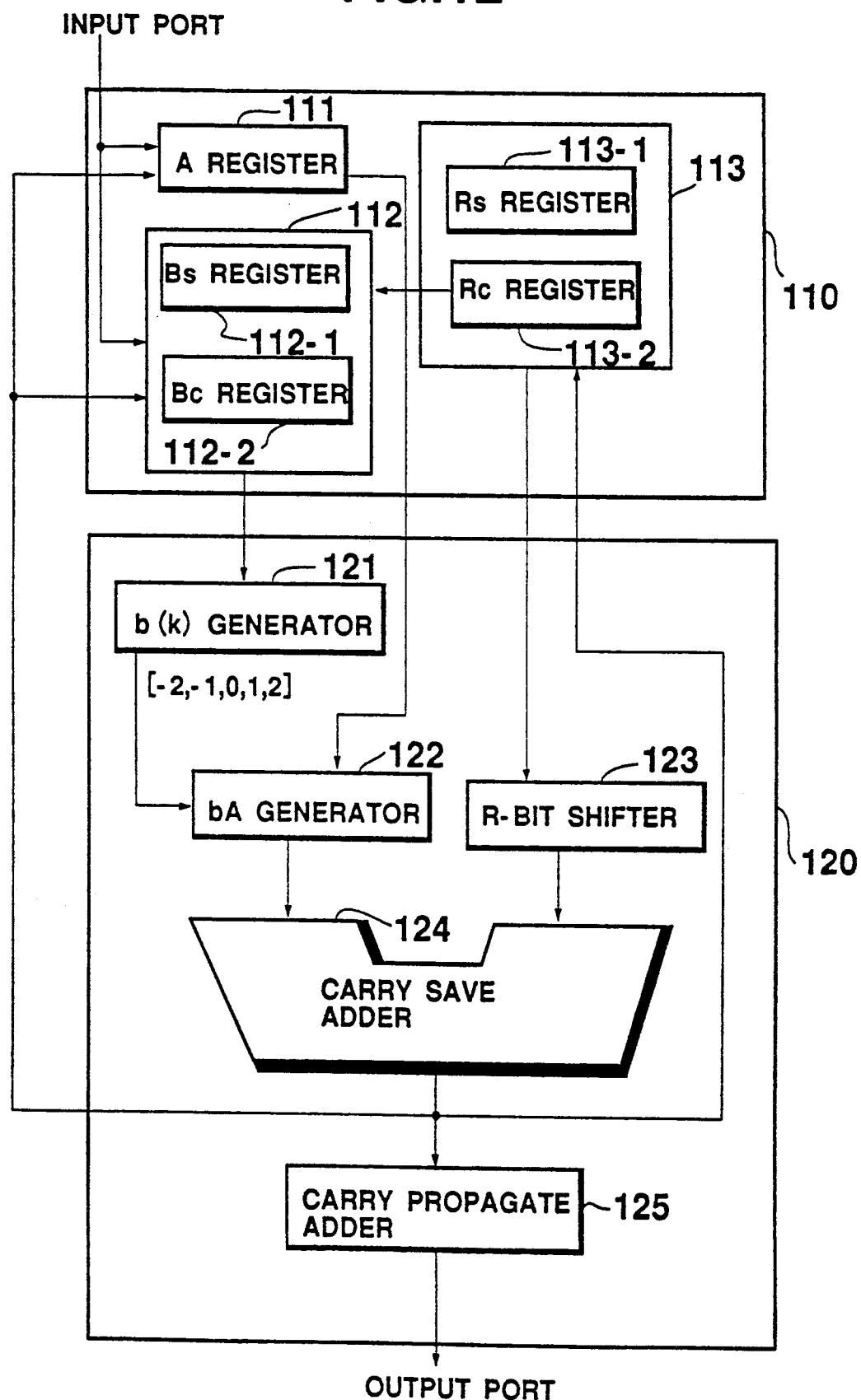
FIG. 12 is a block diagram showing a basic system configuration for assistance in explaining the concept of the method of executing $A \times B$ of the present invention.

FIG. 12 is an entire block diagram of an embodiment of the multiplier system of the present invention, which roughly comprises a register block 110 and an operating block 120.

In FIG. 12, an A register 111 stores a multiplicand A and a B register 112 stores a multiplier B. However, since multiplier B is represented by variables $B_s$ and $B_c$ as $B = B_s + 2B_c$ in redundant representation form, $B_s$ is stored in a $B_s$ register 121-1 and $B_c$ is stored in a $B_c$ register 122-2, respectively. FIG. 13 shows the arrangement order of $B_s$ and $B_c$ in the registers 112-1 and 122-2. An R register 113 stores the final result and work variables R during computation. Since work variable R is represented by $R_s$ and $R_c$ as $R = R_s + 2R_c$ in redundant representation form, $R_s$ is stored in an $R_s$ register 131-1, and $R_c$ is stored in an $R_c$ register 113-2, respectively.

A b(k) generator 121 is provided with a reference table as shown in FIG. 14, and generates multipliers b(k) based on radix 4 (b(k)←(f_c, f_s) on the basis of the variable $B_s$ and $B_c$ over all the bits (k = 1, 2, ... n/2+1). FIG. 14 lists two functions $f_c$ and $f_s$ for multipliers b(k), which can be selected by the combination of $B_s$ and $B_c$, that is, $B_s[2k]$ $B_c[2k-1]$ and $B_s[2k-1]$ $B_c[2k-2]$ as follows:

---

If combination is (0,0,0,0), the data ($f_c$, $f_s$) are (0,0),
If combination is (0,0,0,1), the data ($f_c$, $f_s$) are (0,1),
If combination is (0,0,1,0), the data ($f_c$, $f_s$) are (0,1),
If combination is (0,0,1,1), the data ($f_c$, $f_s$) are (1,−2),
If combination is (0,1,0,0), the data ($f_c$, $f_s$) are (1,−2),
If combination is (0,1,0,1), the data ($f_c$, $f_s$) are (1,−1),
If combination is (0,1,1,0), the data ($f_c$, $f_s$) are (none),
If combination is (0,1,1,1), the data ($f_c$, $f_s$) are (none),
If combination is (1,0,0,0), the data ($f_c$, $f_s$) are (1,−2),
If combination is (1,0,0,1), the data ($f_c$, $f_s$) are (1,−1),
If combination is (1,0,1,0), the data ($f_c$, $f_s$) are (1,−1),
If combination is (1,0,1,1), the data ($f_c$, $f_s$) are (1,0),
If combination is (1,1,0,0), the data ($f_c$, $f_s$) are (1,0),
If combination is (1,1,0,1), the data ($f_c$, $f_s$) are (1,1),
If combination is (1,1,1,0), the data ($f_c$, $f_s$) are (none), and
If combination is (1,1,1,1), the data ($f_c$, $f_s$) are none,

--- where the two left side bits of the combination indicates the bits arranged vertically, and the two right side bits of the combination indicate the bits arranged horizontally.

Further, b(k) can be also obtained by executing the following computation:

$$b(k) \leftarrow -2 \times (B_s[2k] \oplus B_c[2k-1]) + B_s[2k-1] + B_c[2k-2] \quad (1)$$

-continued $$4 \times \overline{(B_s[2k] \oplus B_c[2k-1])} \cdot B_s[2k-1] \cdot B_c[2k-2] + c(k)$$
$$c(k) \leftarrow B_s[2k-2] V B_c[2k-3] V(B_s[2k-3] \cdot B_c[2k-4] \quad (2)$$

Where V denotes the logical sum; · denotes the logical product; $\oplus$ denotes the exclusive OR; — denotes negation; $\times$ denotes the ordinary multiplication; + denotes the ordinary addition; and — denotes the ordinary subtraction. The formed multiplier b(k) is any one of $-2, -1, 0, 1, 2$.

As a bA generator 122 generates the partial products bA according to each value $(-2, -1, 0, 1, 2)$ of b(k) generated by the b(k) generator 121 in such a way that the multiplicand A stored in the A register 111 is shifted one leftward and a twos complement is determined (if b(k) is $-2$); a twos complement is determined (if b(k) is $-1$); zero is outputted (if b(k) is 0); A is outputted as it is (if b(k) is 1); and A is shifted one leftward (if b(k) is 2).

An R bit shifter 123 shifts $R_s$ stored in the $R_s$ register 113-1 and $R_c$ stored in the $R_c$ register 113-2 by two bits rightward. A carry save adder 124 repeatedly executes carry save additions of the outputs from the bA generator 122 and the R bit shifter 123, and stores the added results $R_s$ and $R_c$ in the $R_s$ register 113-1 and the $R_c$ register 113-2, respectively. A carry propagation adder 125 executes $R \leftarrow R_s + 2R_c$ on the basis of $R_s$ and $R_c$ of the final addition results to output a simple multiplication result.

The multiplication processing executed by system shown in FIG. 12 is as follows: the work variable R is initialized to zero; that is, $R_s \leftarrow 0$ and $R_c \leftarrow 0$ are executed for the two R and C registers 113-1 and 113-2; a multiplier b(k) is formed on the basis of the variable B by the b(k) generator 121; b(k)A is executed by the bA generator 122; $R_s \leftarrow 4R_s$ (two-bit rightward shift) and $R_c \leftarrow 4R_c$ (two-bit rightward shift) are executed by the R bit shifter 123; $(2R_c) \oplus R_s \oplus (b(k)A)$, and $((2R_c) \cdot R_s)$ V $(R_s \cdot (b(k)A))$ V $(b(k)A) \cdot (2R_c))$ are executed by the carry save adder circuit 124; two updated $R_s$ and $R_c$ are stored in the $R_s$ and $R_c$ registers 113-1 and 113-2; and the same processings are repeated.

In repeating the multiplications, R stored in the R register 113 is supplied to the B register 112 in redundant representation form, when the multiplication result R is used as a new multiplier B to execute $A \times B$. This operation is executed by the carry save adder circuit 124 as shown in FIG. 15(A).

In the same way, when the multiplication operations are repeated to execute $R \times R$ on the basis of the multiplication result R, R stored in the R register 113 is supplied to the A register 111 and B register 112 in the redundant representation form. In this case, since the multiplicand A is also represented redundantly, a 4-input carry save adder 124 is required as shown in FIG. 15(B).

When a multiplication result is required to output a simple value, $R_s + 2R_c$ is executed by the carry propagation adder (ripple carry adder) 125.

Figure 15:
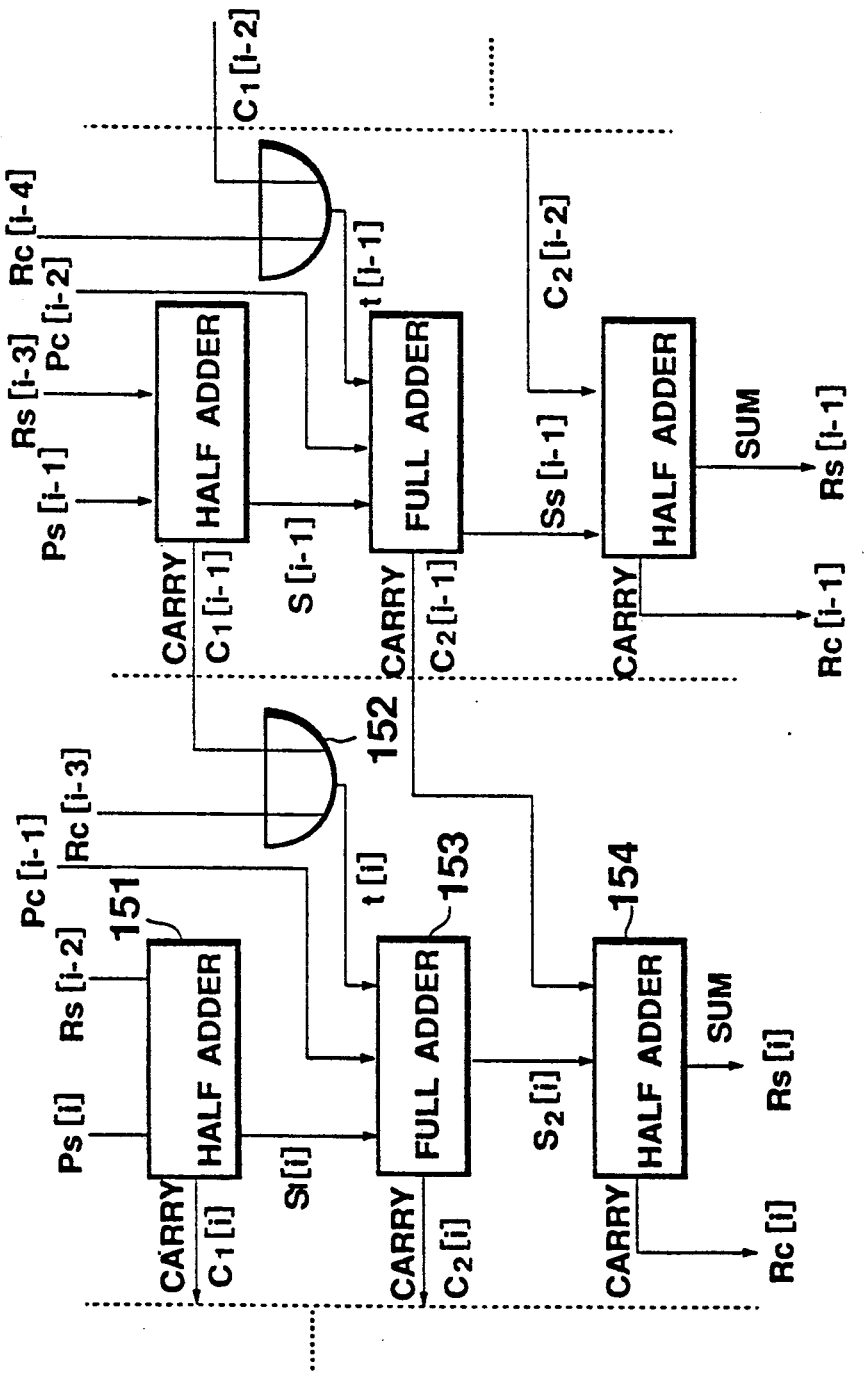
FIG. 15(A) is a block diagram showing a first modification of the carry save adder incorporated in the system shown in FIG. 12, in which the multiplication result or the remainder R is used again for the succeeding multiplication as $A \times R$.
FIG. 15(B) is a block diagram showing a second modification of the carry save adder incorporated in the system shown in FIG. 12, in which the multiplication result or the remainder R is used again for the succeeding multiplication as $R \times R$.
Figure 19:
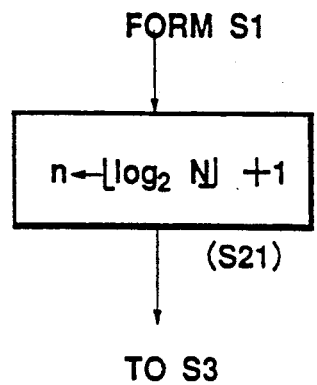
FIG. 19(A) is a flowchart showing a first modification of setting a number n of bits of a modulus N.
FIG. 19(B) is a flowchart showing a second modification of setting a number n of bits of a modulus N.
Figure 19:
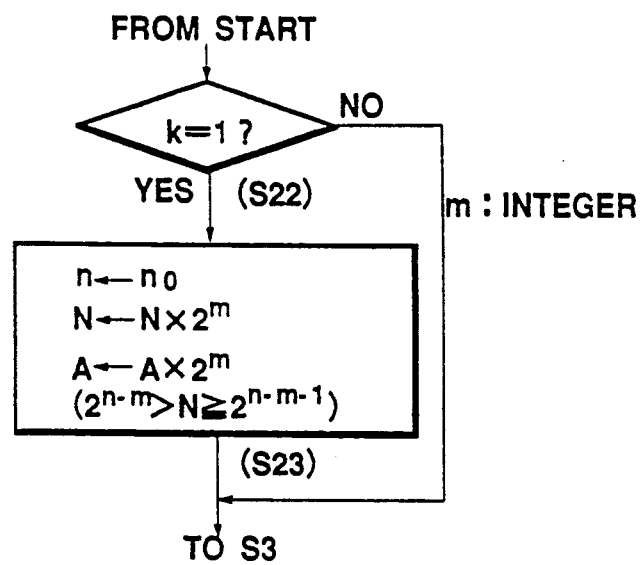
Figure 20:
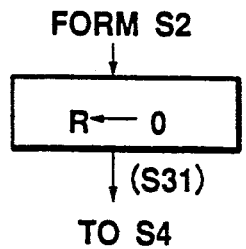
FIG. 20(A) is a flowchart showing a first modification of initializing a partial remainder R.
FIG. 20(B) is a flowchart showing a second modification of initializing a partial remainder $R = R_s + 2R_c$ represented in redundant form.
Figure 20:
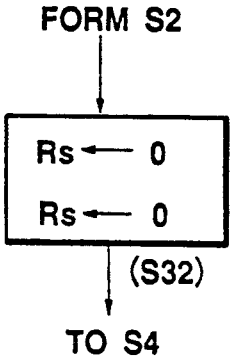
Figure 21:
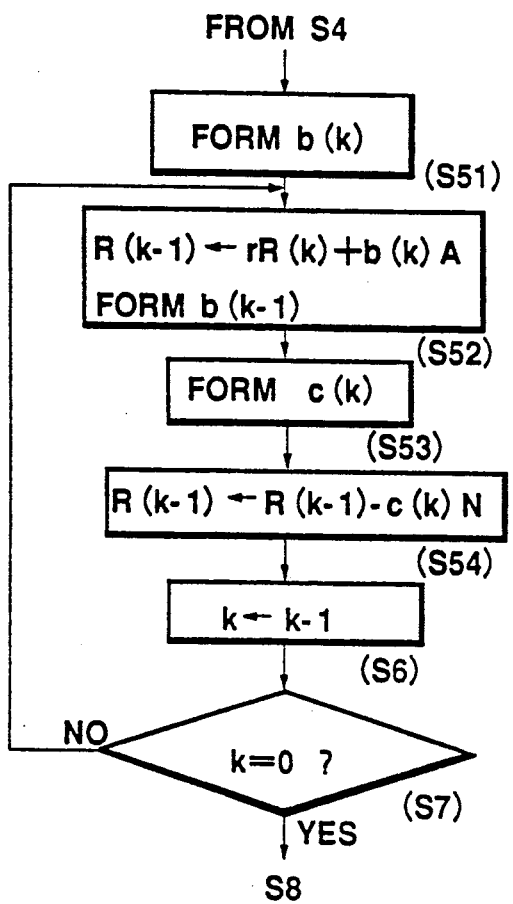
FIG. 21(A) is a flowchart showing a first modification of updating a partial remainder R and forming a partial multiplier b and a partial quotient c.
FIG. 21(B) is a flowchart showing a second modification of updating R and forming b and c.
Figure 21:
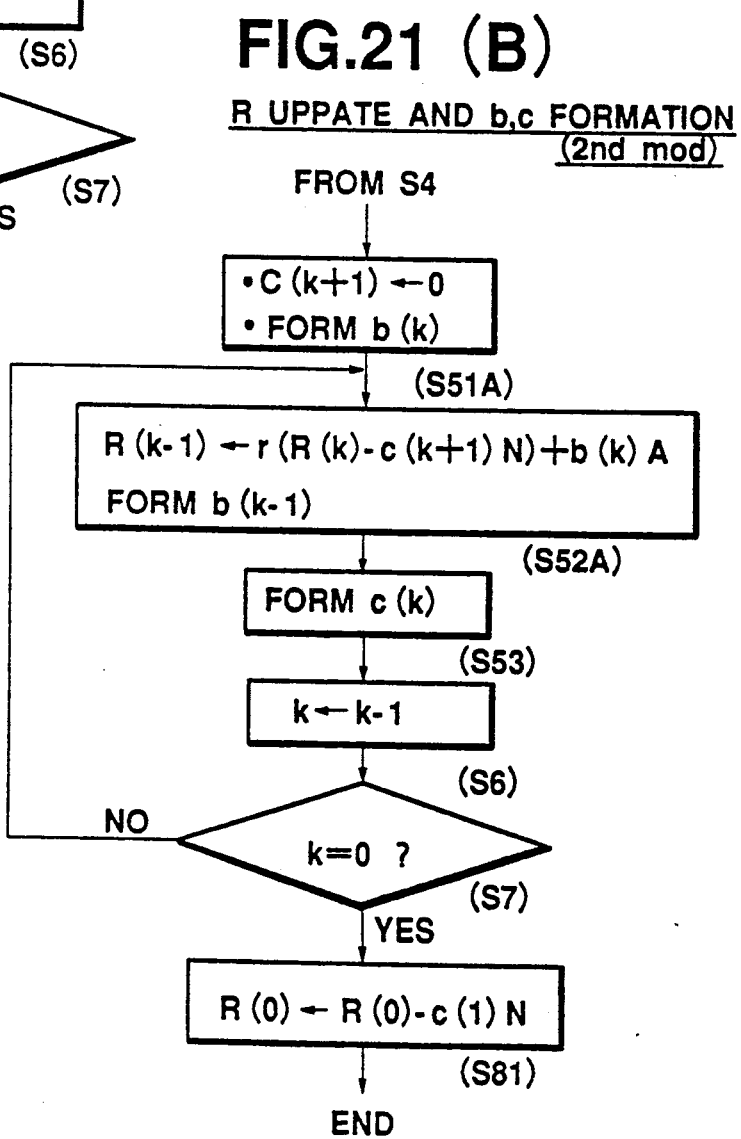
Figure 22:
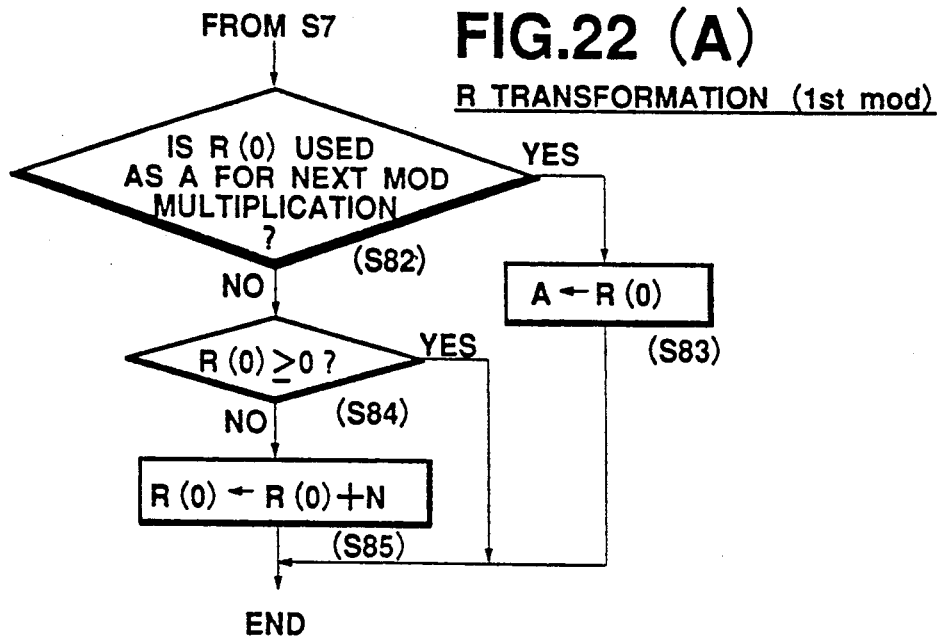
FIG. 22(A) is a flowchart showing a first modification of transforming a final remainder R to a solution of A×B mod N.
FIG. 22(B) is a flowchart showing a second modification of transforming a final remainder R to a solution of A×B mod N.
Figure 22:
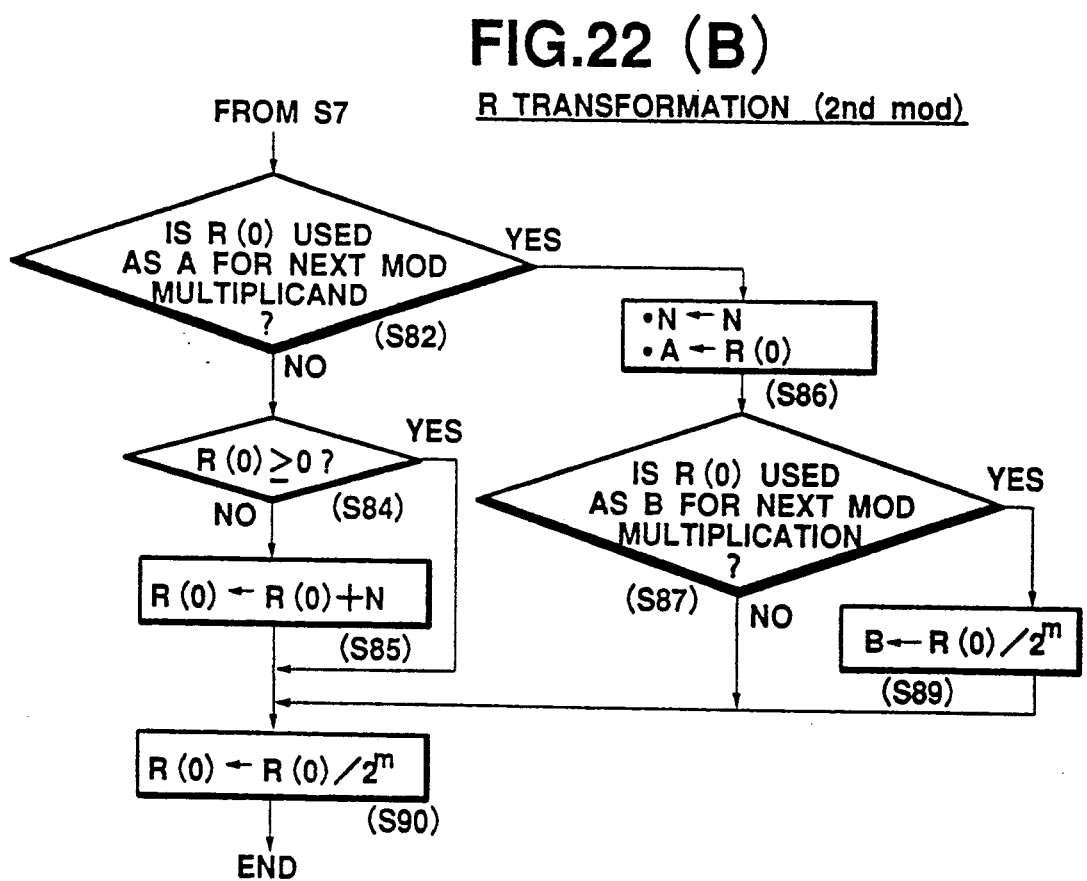
Figure 23:
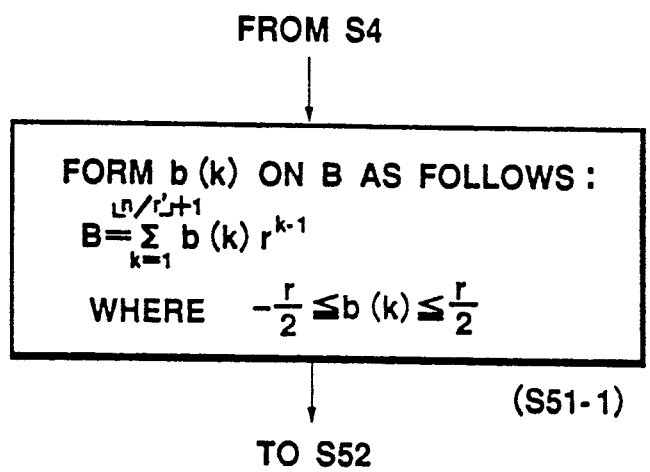
FIG. 23(A) is a flowchart showing a first modification of forming a partial multiplier b when the radix number is r.
FIG. 23(B) is a flowchart showing a second modification of forming a partial multiplier b when the radix number is 4.
FIG. 23(C) is a flowchart showing a third modification of forming a partial multiplier b on the basis of two functions $f_s$ and $f_c$ when a multiplier B is represented in redundant form and the radix number is 4.
FIG. 23(D) is a flowchart showing a fourth modification of forming a partial multiplier b on the basis of two functions $f_s$ and $f_c$ selected with reference to a tble.
FIG. 23(E) is a flowchart showing a fifth modification of forming a partial multiplier b on the basis of two functions $f_s$ and $f_c$ computed by hardware.
Figure 23:
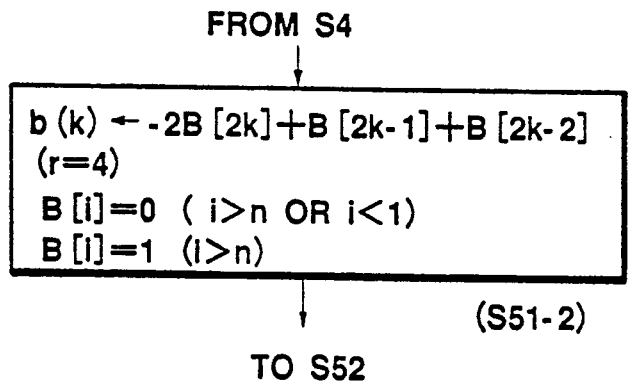
Figure 23:
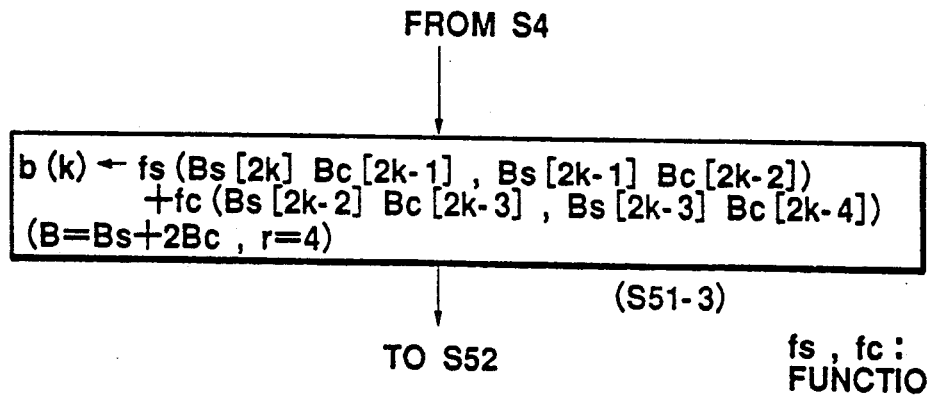

FIG. 15(A) shows a first embodiment of the carry save adder circuit 124, according to the present invention, for executing an addition of a partial product $P = b(k)A$ and a work variable $R = R_s + 2R_c$.

Conventionally, a carry save adder as shown in FIG. 16 has been adopted. However, since the condition of $R_s[2k] \cdot R_s[2k-1] \cdot R_c[2k-1] \cdot R_c[2k-2] = 0$ (where $R_c[0] = 0$) is not always established, when the multiplication result R is used as the succeeding multiplier B as it is, another circuits for executing $B_s \leftarrow R_s (+)(2R_c)$, $B_c \leftarrow R_s \cdot (2R_c)$ are required.

The carry save adder shown in FIG. 15(A) eliminates the above processings as follows: a logical product and a exclusive logical sum $$c[i] \leftarrow P[i] \cdot R_s[i-2], \; s[i] \leftarrow P[i](+)R_s[i-2]$$

are obtained by a first half adder 141 for each integer (i) from n to 1; a logical sum $$t[i] \leftarrow R_c[i-3] \; V_c[i-1]$$

is obtained by an OR circuit 142; a logical product and an exclusive logical sum $$R_c[i] \leftarrow s[i] \cdot t[i], \; R_s[i] \leftarrow s[i](+)t[i]$$

are obtained by a second half adder 143, in order to update the intermediate $R_c$ and $R_s$ during sequential multiplication operations. Since the half adders are provided at the final stage, the above conditions are always satisfied. In general, since the full adder corresponds to two half-adders in circuit volume, the present invention can be realized without increasing the circuit volume.

FIG. 15(B) shows another circuit configuration of the carry save adder 124, which is so expanded that the circuit shown in FIG. 15(A) can execute the addition of redundantly represented multiplicand A. In this carry save adder 124, an addition of the partial product P (formed by $P = b(k)A$ and represented by $P = P_s + 2P_c$) and the work variable R (represented by $R = R_s = 2R_c$) is executed. That is, a logical product and an exclusive OR as $$c_1[i] \leftarrow P_s[i] \cdot R_s[i-2], \; s_1[i] \leftarrow P_s[i](+)R_s[i-2]$$

are executed by a first half adder 151 for each integer (i) from n to 1; a logical sum as $$t[i] \leftarrow R_c[i-3] \; V \; c_1[i-1]$$

is executed by an OR gate circuit 152; and logical sums and two exclusive ORs as $$c_2[i] \leftarrow (s_1[i] \cdot P_c[i-1]) \; V \; (P_c[i-1] \cdot t[i]) \; V \; (t[i] \cdot s_1[i]),$$

$$s_2[i] \leftarrow s_1[i] \oplus P_c[i-1] \oplus t[i]$$

are executed by a full adder 152, and a logical product and an exclusive OR as $$R_c[i] \leftarrow s_2[i] \cdot c_2[i-1], \; R_s[i] \leftarrow s_2[i] \oplus c_2[i-1]$$

are executed by a second half adder 154.

As described above, the multiplier system of the present invention provides the following advantages:

(1) Since the multipliers based on radix 4 are represented in redundant representation form and obtained beginning from any given bit, the invention is effective for modular multiplication, in particular when the multiplier is processed beginning from a higher bit.

(2) Being different from the method of Takagi et al, since the value can be determined definitely, the present invention can reduce the number of computational stages and hardware volume. In particular, when the multipliers are obtained in sequence from the higher significant bit to the lower significant bit, the computational speed can be improved markedly.

(3) Since the condition that $$B_s[2k] \cdot B_s[2k-1] \cdot B_c[2k-1] \cdot B_c[2k-2] = 0$$

is established over all the bits (k=1, 2, ...) is not a special condition, it is possible to easily replace full adders with half adders at the output stages of the carry save adder circuits.

This is because in the case of the modular multiplication, since a processing step $R \leftarrow R - cN$ is present in execution of $R \leftarrow 4(R-cN) + bA$ (if bA=0), the above condition is usually established.

To facilitate understanding of the modular multiplication according to the present invention, the computational procedure thereof will be described systematically with reference to flowcharts shown in FIGS. 17 to 24.

FIG. 17 shows a basic procedure of the method of computating $A \times B$ mod N of the present invention after three variables (A(multiplicand), B(multiplier) and N(modulus)) have been inputted to the system.

Control first transforms a multiplicand A to $A-N$ if $2A-N<0$, after normalization of N (in step S1), sets a bit length n of the modulus N (in step S2), initializes a partial remainder R (in step S3), and then determines the number k of repeated processing stages (in step S4) as $$k \leftarrow \lfloor n/r' \rfloor + 1$$

where $\lfloor x \rfloor$ denotes a maximum integer less than x; $r=2^{r'}$, ($r' \geq 1$); and r denotes a radix number.

Thereafter, control updates the partial remainder R and forms a partial multiplier b and a partial quotient c both within a range of $-r/2 \leq b, c \leq r/2$ (in step S5), and updates the stage number (k) (in step 6) as $$k \leftarrow k-1$$

Here, control checks whether the current stage number k is zero (in step S7). If k is not zero, control returns to step S5 for repeating the same steps S5 and S6. If k is zero, since this indicates that the final computation result or the final remainder R(0) has been obtained, control transforms R to a final result as a solution of $A \times B$ mod N (in step S8), ending the computation control. In FIG. 17, it should be noted that the feature of the present invention is to transform A to $A-N$ if $2A-N<0$ and to form b and c within the same predetermined range of $-r/2 \leq b, c \leq r/2$.

FIG. 18(A) shows a first modification of A transformation method (in step S1). Control checks whether absolute value of A is equal or smaller than N/2 (in step S11) as $$|A| \leq N/2 \text{ or } |A| \simeq N/2 ?$$

If $|A| \leq N/2$ or $|A| \simeq N/2$, control directly proceeds to step S2. If $|A| > N/2$, control transforms A (in step S12) before proceeding to step S2 as $$A \leftarrow A - N.$$

FIG. 18(B) shows a second modification of the A transformation method (in step S1). Control checks whether $(2A-N)$ is less than zero when the original A is $N > A \geq 0$ (in step S11-1) as $$2A - N < 0 ?$$

If $2A-N<0$, control directly proceeds to step S2. If $2A-N \geq$ control transforms A (in step 12) before proceeding to step S2 as $$A \leftarrow A - N.$$

FIG. 18(C) shows a third modification of the A transformation method (in step S1). Control checks whether $(2A_{top} - N_{top})$ is less than zero when the original $A_{top}$ is $N_{top} > A_{top} \geq 0$ (in step S11-2) as $$2A_{top} - N_{top} < 0 ?$$

where $A_{top}$ denotes a specified number of higher significant bits of the multiplicand A and $N_{top}$ denotes the same specified number of higher significant bits of the modulus N. If $2A_{top} - N_{top} < 0$, control directly proceeds to step S2. If $2A_{top} - N_{top} \geq 0$, control transforms $A_{top}$ (in step 12) for approximate transforrmation before proceeding to step S2 as $$A \leftarrow A_{top} - N_{top}.$$

FIG. 19(A) shows a first modification for the n-setting method (in step S2). Control sets the bit length n of the modulus N (in step S21) before proceeding to step S3 as $$n \leftarrow \log_2 N + 1.$$

FIG. 19(B) shows a second modification of the n-setting method (in step S2). Control first checks whether the current stage is the first stage (in step S22) as $$k = 1 ?$$

If the current stage is not the first stage, control directly proceeds to step S3. If the current stage is the first stage, control sets r, N and A (in step S23) before proceeding to step S3 as $$n \leftarrow n_o$$

$$N \leftarrow N \times 2^m$$

$$A \leftarrow A \times 2^m$$

where an integer m can be determined in accordance with the following expression as $$2^{n-m} > N \geq 2^{n-m-1} \text{ (N: the original modulus)}$$

FIG. 20(A) shows a first modification of the R initialization method (in step S3). Control initializes the partial remainder R simply (in step S31) before proceeding to step S4 as $$R \leftarrow 0.$$

FIG. 20(B) shows a second modification of the R initialization method when R is represented in redundant form as $$R = R_s + 2R_c$$

where $R_s$ denotes the sum of R and $R_c$ denotes the carry of R. In this case control initializes the partial remainder R (in step S32) before proceeding to step S4 as $R_s \leftarrow 0$ $R_c \leftarrow 0$.

FIG. 21(A) shows a first modification of R-update and b, c formation method (in step S5). Control first forms partial multiplier b(k) at the current stage (in step S51), and updates the partial remainder R(k−1) for the succeeding stage as $$R(k-1) \leftarrow rR(k) + b(k)A$$

where b(k)A denotes a partial product at the current stage k, and further forms the partial multiplier b(k−1) at the succeeding stage in step (S52). Thereafter, control forms a partial quotient c(k) at the current stage (in step S53) and updates the partial remainder R(k−1) at the succeeding stage (k−1) again (in step S54) as $$R(k-1) \leftarrow R(k-1) - c(k)N$$

where c(k)N denotes a modular subtracter. Thereafter, control proceeds to the basic steps (S6) and (S7).

FIG. 21(B) shows a second modification of R-update and b, c formation method (in step S5). Control first resets the partial quotient c(k+1) at the preceding stage (k+1) as $$c(k+1) \leftarrow 0$$

and further forms the partial multiplier b(k) at the current stage (in step S51A), and updates the partial remainder R(k−1) at the succeeding stage as $$R(k-1) \leftarrow r(R(k) - c(k+1)N) + b(k)A$$

and forms the partial multiplier b(k−1) at the succeeding stage in step (S52A). Thereafter, control forms a partial quotient c(k) at the current stage (in step S53). Thereafter, control proceeds to the basic steps (S6) and (S7). In this second modification, the final partial remainder R(0) is obtained after step S7 (in step S81) as $$R(0) \leftarrow R(0) - c(1)N.$$

FIG. 22(A) shows a first modification of R transformation (in step S8). Control first checks whether the final remainder R(0) is used again as a multiplicand A for the succeeding modular multiplication computation (in step S82). If R(0) is used again as A, control substitutes R(0) for A (in step S83) as $$A \leftarrow R(0)$$

before ending the computation control. However, if R(0) is not used again as A (in step S82), control checks whether R(0) is equal to or more than zero (in step S84). If R(0) is equal to or more than zero, control ends. However, if R(0) is less than zero, control determines the final partial remainder R(0) (in step S85) as $$R(0) \leftarrow R(0) + N.$$

FIG. 22(B) shows a second modification of R transformation (in step S8). Control first checks whether the final remainder R(0) is used again as a multiplicand A for the succeeding modular multiplication (in step S82). If R(0) is used as A again, control substitutes R(0) for A without changing N (in step S86) as $$N \leftarrow N$$

$$A \leftarrow R(0).$$

Control checks whether the final remainder R(0) is used again as a multiplier B for the succeeding modular multiplication computation (in step S87). If R(0) is used again as B, control substitutes $R(0)/2^m$ for B (in step S89) as $$B \leftarrow R(0)/2^m$$

and control determines R(0) (in step S90) as $$R(0) \leftarrow R(0)/2^m$$

before ending the computational control. However, if R(0) is not used again as B (in step S,7), control directly proceeds to step S90.

On the other hand, if R(0) is not used again as A (in step S82), control checks whether R(0) is equal to or more than zero (in step S84). If R(0) is equal to or more than zero, control proceeds to step 90. However, if R(0) < 0, control determines the final partial remainder R(0) (in step S85) as $$R(0) \leftarrow R(0) + N.$$

Thereafter, the final partial remainder R(0) is obtained after step S85 (in step S90) as $$R(0) \leftarrow R(0)/2^m.$$

FIG. 23(A) shows a first modification of the b(k) formation method (in steps S5, S51, S52A). Control forms partial multiplier b(k) within a range of $-r/2 \leq b(k) \leq r/2$ on the basis of the following equation (in step S51-1) as $$B = \sum_{k=1}^{\lfloor n/r \rfloor + 1} b(k) r^{k-1}$$

FIG. 23(B) shows a second modification of the b(k) formation method. Control forms partial multiplier b(k) on the basis of the following expression (in step S51-2) as $$b(k) \leftarrow -2B[2k] + B[2k-1] + B[2k-2]$$

when B = B[n], B[n−1] ... B[1] and the radix number r = 4, where B[i] = 0 if i > n or i < 1 and B[i] = 1 if i > n.

When the radix number is r, the partial multiplier b(k) can be expressed as $$b(k) \leftarrow -rB(r^k) \sum_{m=\phi}^{r-1} rB[r^k - m] / 2^{m+1} + B[r^k - r]$$

FIG. 23(C) shows a third modification of b(k) formation method. Control forms the partial multiplier b(k) on the basis of the following expression (in step S51-3) as $$b(k) \leftarrow f_s (B_s [2k] B_c [2k-1], B_s [2k-1] B_c [2k-2]) + f_c (B_s [2k-2] B_c [2k-3], B_s [2k-3] B_c [2k-4])$$

when $B = B_s + 2B_c$ is represented in redundant form and r = 4.

FIG. 23(D) shows a fourth modification of b(k) formation method. Control selects two values of the two functions fc and fs in combination of ($B_s[2k]\ B_c[2k-1]$) and $B_s[2k-1]\ B_c[2k-2]$ from the reference table below (in step S51-4):

| $B_s[2k]B_c[2k-1]$ | $B_s[2k-1]B_c[2k-2]$ | | | |
|---|---|---|---|---|
|  | 00 | 01 | 11 | 10 |
| 00 | 0, 0 | 0, 1 | 1, −2 | 0, 1 |
| 01 | 1, −2 | 1, −1 | x | x |
| 11 | 1, 0 | 1, 1 | x | x |
| 10 | 1, −2 | 1, −1 | 1, 0 | 1, −1 | where x denotes no values.

FIG. 23(E) shows a fifth modification of b(k) formation method. Control forms the partial multiplier b(k) by computating the two functions fs and fc in step (S51-5) as follows:

$$fc \leftarrow (B_s[2k] V B_c[2k-1]) V (B_s[2k-1] \cdot B_c[2k-2])$$

$$fc \leftarrow -2 \times (B_s[2k] \oplus B_c[2k-1]) + B_s[2k-1] + B_c[2k-2] - 4 \times \overline{(B_s[2k](+)B_c[2k-1])} \cdot B_s[2k-1] \cdot B_c[2k-2]$$

where ⊕ denotes the exclusive OR; · denotes the logical sum; V denotes the logical product; — denotes the negation; and [ ] denotes the bit level vectors with a sign bits.

FIG. 24(A) shows a first modification of the c(k) formation method (in steps S5, S53). Control determines comparative boundary indices l immediately after the A transformation step (51) by the following definition (in step S53-1) as $$l_i b(k-1) \equiv i - \tfrac{1}{2} - b(k-1)A/rN$$

$$l_{-i} b(k-1) \equiv i + \tfrac{1}{2} - b(k-1)A/rN$$

$$b(k-1) \in \{-r/2, -r/2+1, \ldots -1, 0, 1, \ldots r/2-1, r/2\}$$

where ε denotes the set from −r/2 to r/2. Thereafter, control determines c(k) on the basis of two adjacent boundary indices (in step S53-2) as $c(k)=i$, if $l_i N < R(k-1) \leq l_{i+1} N$ $c(k)=0$, if $l_{-1} N < R(k-1) \leq l_1 N$ $c(k)=-i$, if $l_{-i-1} N < R(k-1) \leq l_{-i} N$.

FIG. 24(B) shows a second modification of the c(k) formation method. Control determines comparative boundary indices l and c(k) in the same way as in the first modification shown in FIG. 24(A) on the basis of $A_{top}$, $N_{top}$ and $R_{top}$ (specified higher significant bits of A, N, and R) (in step S53-3) as $$l_i b(k-1) \equiv i - \tfrac{1}{2} - b(k-1)A_{top}/rN_{top}$$

$$l_{-i} b(k-1) \equiv i + \tfrac{1}{2} - b(k-1)A_{top}/rN_{top}$$

$$b(k-1)\in\{-r/2, -r/2+1, \ldots -1, 0, 1, \ldots r/2-1, r/2\}$$

$c(k)=i$, if $l_i N_{top} < R_{top}(k-1) \leq l_{i+1} N_{top}$ $c(k)=0$, if $l_{-1} N_{top} < R_{top}(k-1) \leq l_1 N_{top}$ $c(k)=-i$, if $l_{-i-1} N_{top} < R_{top}(k-1) \leq l_{-i} N_{top}$ FIG. 24(C) shows a third modification of c(k) formation method. Control sets [i] (in steps S53-4) as $i = |R|/N + 1$ and checks whether $R(k-1)$ is equal to or more than zero (in step S53-5) as $R(k-1) \geq 0$ ?

If $R(k-1) \geq 0$, control checks whether $l_i$ is equal to or less than $R(k-1)/N$ (in step S53-6) as $l_i \leq R(k-1)/N$ ?

If $l_i \leq R(k-1)/N$, control determines c(k) (in step S53-8) as $c(k)=i$

If $l_i > R(k-1)/N$, control determines c(k) (in step S53-9) as $c(k)=i-1$

If $R(k-1) < 0$ in step (S53-5), control checks whether $|1_{-i}|$ is equal to or less than $|R(k-1)|/N$ (in step S53-7) as $|1_{-i}| \leq |R(k-1)|/N$ ?

If $|1_{-i}| \leq |R(k-1)|/N$, control determines c(k) (in step S53-10) as $c(k) = -i$ If $|1_{-i}| > |R(k-1)|/N$, control determined c(k) (in step S53-11) as $c(k) = -i+1$.

At present, the maximum throughput of LSIs (large-scale integrated circuits) now on the market for RSA public-key cryptosystems is about 30 kbit/s. However, where the present invention has been adopted to the systems, it is possible to increase the throughput approximately twice without increasing the hardware volume. Further, it is possible to more increase the throughput in principle with increasing hardware volume. In other words, it is possible to economically realize LSIs with a basic transfer speed of 64 kbit/s.

In addition, the method and the system of the present invention enable high speed data processing by means of a relatively small-volume hardware. For instance, at present it takes several minutes for a single RSA cryptographic processing in the case of an IC card chip (provided with an 8-bit microprocessor). However, it is possible to reduce the same cryptographic processing time down to several seconds, when the method and system of the present invention are incorporated in the IC card chip. Further, the present invention is effectively applicable to various systems which require a high speed modular multiplication processing, without being limited to cryptographic and authentic systems which require multibit length modular multiplication on modular exponentiation computations.

As described above, the modular multiplication method and the system according to the present invention can realize a high speed computation r' times higher than the prior-art method and system. Further, the system can be configured by simply arranging the same circuits in series for facilitation of system design.

Although the modular subtracters for division must be checked whenever the partial remainders are added, since only the higher significant bits are checked, it is possible to reduce the number of comparison operations down to 1/r' times, thus reducing the number of comparator circuits and the capacity of the memory incorporated in the system. In addition, since the number of memory access is reduced, the computational speed can be increased.

What is claimed is:

1. A modular multiplication system for executing a modular multiplication of A×B modulo N on the basis of a radix number r, where A denotes a multiplicand, B denotes a multiplier, and N denotes a modulus, which comprises:
   (a) first register means (11) for storing a multiplicand A;
   (b) second register means (13) for storing a multiplier B;
   (c) third register means (15) for storing a modulus N;
   (d) fourth register means (17) for storing a partial remainder R;
   (e) normalizing means (21) responsive to said third register means for normalizing the modulus N;
   (f) parameter generating means (23) responsive to said first, second, third and fourth register means and said normalizing means, for generating partial multipliers b(k) and partial quotient c(k), where (k) denotes a number of processing stages from $(k=\lfloor n/r \rfloor + 1)$ to (0);
   (g) partial product generating means (31) responsive to said first register means and said parameter generating means, for generating partial products b(k)A;
   (h) modular subtracter generating means (33) responsive to said third register means and said parameter generating means, for generating modular subtracters c(k)N;
   (i) remainder updating means (35) responsive to said fourth register means, for updating remainder R(k);
   (j) carry save adder means (37) responsive to said partial product generating means, said modular subtracter generating means, and said remainder updating means, for executing carry save addition of $R_{new} \leftarrow r \times (R_{old} - c(k)N) + b(k)A$ to update the remainder R(k) stored in said fourth register means, where $R_{new}$ denotes an updated remainder;
   (k) carry propagation adder means (39) responsive to said carry save adder means, for executing carry propagation addition to update the multiplicand A stored in said first register means by $R_{new}$ and generating a solution of $R(0) = A \times B$ modulo N; and
   (l) sequence control means responsive to all said means, for sequentially controlling computational operations.

2. The modular multiplication system of claim 1, wherein said normalizing means (21) transforms the multiplicand A and modulus N as $N \leftarrow N \times 2^m$, $A \leftarrow A \times 2^m$ where $2^{n-m} > N \geq 2^{n-m-1}$, n denotes a bit length of N, and m denotes an integer.

3. The modular multiplication system of claim 1, wherein said parameter generating means (23) comprises:

(a) partial multiplier generating means (23A) responsive to said second register, for generating partial multipliers b(k) within a range of $-r/2 \leq b \leq r/2$;
   (b) partial quotient generating means (23B) responsive to said first, third and fourth register means and to said partial multiplier generating means, for generating partial quotient c(k) within a range of $-r/2 \leq c \leq r/2$;
   (c) comparative index generating means (23c) responsive to said first and third register means and said partial multiplier and quotient generating means, for generating comparative index l for determining a range in a modified Robertson diagram; and
   (d) comparator means (23D) responsive to said first and third register means, for comparing the multiplicand A with the modulus N to allow said partial multiplier and quotient generating means to generate $b(k) = 1$ and $c(k) = -1$, respectively so that A is transformed to A−N through said partial product and modular subtracter generating means when $|A| > N/2$ or $2A - N > 0$.

4. The modular multiplication system of claim 1, wherein said sequence control means (25) executes initialization, data transfer, bit shift operation, and processing stage number decrement.

5. A modular multiplication system in a data processing system for executing a modular multiplication of A×B modulo N on the basis of a radix number r, where A denotes a multiplicand, B denotes a multiplier, and N denotes a modulus, which comprises:
   (a) first means for transforming a data A to A−N if $|A| \leq N/2$ and distributing data A, B, and N inputted through an input port, respectively;
   (b) second means responsive to said first means, for storing the data A, B, and N, generating partial multipliers b and partial quotient c within a range of $-r/2 \leq b, c, \leq r/2$ and partial remainders R, and executing carry-save multiply- and modulo-additions/subtractions of partial products bA and of modular subtracters cN to obtain the partial remainder R, respectively; said second means including a series of connected cells (43a to 43n+3), where n denotes the number of bits of variables A, B, and N, and each cell (43i) comprises:
      (1) a first register for storing an i-th bit of the modulus N;
      (2) a second register for storing an i-th bit of the multiplicand A;
      (3) a third register for storing each carry bit $R_c[i]$ of partial remainder R;
      (4) a fourth register for storing each sum bit $R_s[i]$ of partial remainder R;
      (5) a partial product generator connected to said second register, for generating partial products bA or logical zero by selecting two adjacent bit data of the multiplicand A on the basis of partial multiplier b;
      (6) a modular subtracter generator connected to said first register, for generating modular subtracters cN or logical zero by selecting two adjacent bit data of the modulus N on the basis of a partial quotient c; and
      (7) a carry save adder connected to said third and fourth registers, said partial product generator and said modular subtracter generator, for executing carry-save addition, respectively;
   (c) third means for selecting output bits of the partial remainder R in correspondence to a bit length of the parallel output port and outputting the selected bits;

(d) fourth means for executing carry propagation addition of the obtained final remainder and outputting a solution of A×B modulo N through an output port; and (e) fifth means for controlling operations of said first to fourth means.

6. The modular multiplication system of claim 5, wherein said carry save adder comprises:

(a) a first full adder connected to said partial product generator and said third and fourth registers, for generating a sum bit and an intermediate carry bit $c'[i]$;

(b) a second full adder connected to said modular subtracter generator and said first full adder and responsive to an intermediate carry bit $c'[i-1]$, for generating each remainder sum bit $R[i]_{sum}$ and each remainder carry bit $R[i]_{carry}$, respectively.

7. The modular multiplication system of claim 5, wherein said carry said adder comprises:

(a) a first half adder connected to said partial product generator and modular subtracter generator, for generating a first sum bit and a first carry bit;

(b) a second half adder connected to said third and fourth registers, for generating a second sum bit and a second carry bit;

(c) a full adder connected to said first and second half-adder sums and responsive to an intermediate carry bit $c'[i-1]$, for generating a partial remainder sum bit $R[i]_{sum}$ and a third carry bit;

(d) an AND gate for ANDing the first and second carry bits;

(e) a first OR gate for ORing an output of said AND gate and the third carry bit, for generating a partial remainder carry bit $R[i]_{carry}$; and (f) a second OR gate for ORing the first and second carry bits, for generating an intermediate carry bits $c'[i]$.

* * * * *